United States Patent
Ooishi et al.

(10) Patent No.: US 8,625,249 B2
(45) Date of Patent: Jan. 7, 2014

(54) CONTROL APPARATUS FOR ELECTROMAGNETIC INDUCTIVE LOAD

(75) Inventors: Eiichirou Ooishi, Susono (JP); Mitsuaki Morimoto, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/595,375

(22) Filed: Aug. 27, 2012

(65) Prior Publication Data

US 2012/0319499 A1  Dec. 20, 2012

Related U.S. Application Data

(63) Continuation of application No. PCT/JP2011/055424, filed on Mar. 8, 2011.

(30) Foreign Application Priority Data

Mar. 9, 2010 (JP) ................................. 2010-051297

(51) Int. Cl.
*H01H 47/00* (2006.01)

(52) U.S. Cl.
USPC .......................................... 361/160; 361/139

(58) Field of Classification Search
USPC .................................. 361/139, 160
See application file for complete search history.

(56) References Cited

U.S. PATENT DOCUMENTS

| 5,402,045 | A | 3/1995 | Mori |
| 2004/0120094 | A1* | 6/2004 | Satoh ............................ 361/160 |
| 2005/0105239 | A1* | 5/2005 | Satoh et al. ................... 361/139 |
| 2011/0109168 | A1 | 5/2011 | Morimoto et al. |

FOREIGN PATENT DOCUMENTS

| JP | 5252769 A | 9/1993 |
| JP | 2001263531 A | 9/2001 |
| JP | 2006198850 A | 8/2008 |
| JP | 2008306791 A | 12/2008 |
| JP | 2009289689 A | 12/2009 |

OTHER PUBLICATIONS

International Search Report for PCT/JP2011/055424 dated May 24, 2011 [PCT/ISA/210].

Written Opinion for PCT/JP2011/055424 dated May 24, 2011 [PCT/ISA/237].

* cited by examiner

*Primary Examiner* — Danny Nguyen

(74) *Attorney, Agent, or Firm* — Sughrue Mion, PLLC

(57) ABSTRACT

A control apparatus for an electromagnetic inductive load is a circuit in which a switching element that is PWM-controlled and the electromagnetic inductive load are connected together in series between a DC power supply and a ground. The control apparatus includes a current sensing unit which senses a regenerative current in an OFF time in a PWM driving operation, a current detecting unit which outputs a current detection signal when a sense current becomes smaller than a target current amount, a PWM signal generating unit which receives a clock signal and the current detection signal, and generates a PWM signal that is at a high or low level during a period from the current detection signal being smaller than the target current amount, to rising or falling of the clock signal, and a driving unit which controls to drive the switching element.

7 Claims, 26 Drawing Sheets

CONTROL APPARATUS FOR ELECTROMAGNETIC INDUCTIVE LOAD

CROSS REFERENCE TO RELATED APPLICATION

This application is a continuation of PCT application No. PCT/JP2011/055424, which was filed on Mar. 8, 2011 based on Japanese Patent Application (No. 2010-051297) filed on Mar. 9, 2010, the contents of which are incorporated herein by reference. Also, all the references cited herein are incorporated as a whole.

BACKGROUND OF THE INVENTION

1. Technical Field

The present invention relates to a control apparatus which PWM (Pulse Width Modulation) controls an electromagnetic inductive load such as an electromagnetic clutch or a relay coil.

2. Background Art

Usually, an electromagnetic inductive load such as an electromagnetic clutch or a relay coil is subjected to the PWM control in order to reduce the power consumption. JP-A-2008-198850 shows one example of the above, and a current control apparatus disclosed therein is configured as shown in FIG. 24.

Referring to FIG. 24, a current which flows from a battery 1 to a clutch solenoid 3 that is a load, and a current sense resistor 4 through a transistor 2 is sensed via an amplification circuit 5, and, based on the sense value, a computing unit (microcomputer) 6 calculates a duty cycle so as to obtain a given average current amount as shown in FIG. 25, thereby PWM-driving the transistor 2.

In FIG. 24, reference numeral 7 denotes a freewheel diode, and reference numeral 8 denotes a clutch solenoid drive circuit. FIG. 25 shows graphs for illustrating a method of determining the duty cycle.

SUMMARY OF THE INVENTION

In the conventional art, however, the computing unit and A/D converter which are used for converting the sensed current amount to the duty cycle are necessary, thereby producing a problem in that the circuit is expensive.

In a control method in which an average current amount is managed, the ripple of a coil current is increased by an increase of the load inductance or the power supply voltage, and there is a possibility that the current may fall below the minimum operating current.

In this case, it is contemplated that an operation failure such as clutch slipping or separation of relay contacts may occur. Therefore, a countermeasure that a sufficient margin is set must be taken, thereby causing wasteful power consumption.

In order to solve this, also a method has been proposed in which, as shown in FIG. 26, the PWM is turned ON/OFF at the lower and upper limit values of the current flowing through the load. In this case, the PWM frequency is determined by the inductance of the load (when the inductance is low, the frequency is high as shown in FIG. 26(a), and, when the inductance is high, the frequency is low as shown in FIG. 26(b)). Therefore, there is a possibility that, when the frequency corresponds to an audible frequency, abnormal noises may be generated.

In a circuit design, moreover, validations of the switching loss and noises according to the frequencies of loads must be performed.

The present invention has been conducted in order to solve the problems that a computing unit and A/D converter which are used for converting a sensed current amount to a duty cycle are necessary, and that the circuit is expensive.

A control apparatus for an electromagnetic inductive load according to a first aspect of the invention so as to solve the problems is configured so that the control apparatus is a circuit in which a switching element that is PWM-controlled and the electromagnetic inductive load are connected together in series between a DC power supply and a ground, and includes: a current sensing unit which senses a regenerative current in an OFF time in a PWM driving operation of the switching element; a current detecting unit which outputs a current detection signal when a sense current sensed by the current sensing unit becomes smaller than a target current amount; a PWM signal generating unit which receives a clock signal of a given frequency and the current detection signal output from the current detecting unit, and which generates a PWM signal that is at a high level or a low level during a period from an output of a signal indicating a sense that the current detection signal becomes smaller than the target current amount, to rising or falling of the clock signal; and a driving unit which is disposed between the PWM signal generating unit and the switching element, and which controls to drive the switching element.

In the above configuration, the current sensing unit senses that the sense current (the regenerative current in the OFF time in the PWM driving of the switching element) detected by the current detecting unit becomes smaller than the target current amount, and the PWM signal is generated based on the current detection signal and the clock signal. When the switching element is controlled by the PWM signal, therefore, the duty cycle corresponding to the target current amount can be automatically adjusted without calculating the duty cycle by means of a computing unit or the like.

Moreover, the target current amount is adjusted so as to have a value which is equal to or larger than a minimum operating current of the load. Therefore, the load current is not reduced below this value, and an operation failure of the load such as clutch slipping or separation of relay contacts can be prevented from occurring.

Furthermore, the PWM frequency is equal to the frequency of the clock, and hence the PWM control can be performed at a constant frequency irrespective of the inductance of the load.

The control apparatus for the electromagnetic inductive load according to a second aspect of the invention is configured to include: a power supply voltage monitoring unit which monitors a voltage of the DC power supply, and which outputs a voltage reduction signal during a period when the power supply voltage is reduced to or below a set voltage; and a DC drive signal generating unit which receives the voltage reduction signal output from the power supply voltage monitoring unit, and which outputs a DC drive signal that is always at the high level during the power supply voltage reduction period and a given time period after the voltage reduction is returned, wherein the driving unit receives the DC drive signal output from the DC drive signal generation and the PWM signal output from the PWM signal generating unit.

The control apparatus for the electromagnetic inductive load according to a third aspect of the invention is configured to include: a logical sum unit which logically sums the clock signal and the PWM signal generated by the PWM signal generating unit, wherein the driving unit receives an output of the logical sum unit.

The control apparatus for the electromagnetic inductive load according to a fourth aspect of the invention is configured so that the current sensing unit is disposed in a regenerative current flow path through which a regenerative current in the OFF time during the PWM driving operation of the switching element flows.

The control apparatus for the electromagnetic inductive load according to a fifth aspect of the invention is configured so that the switching element is placed on a side of the DC power supply to be subjected to high-side driving, the current sensing unit includes a sense resistor which is interposed in the regenerative current flow path, and the current detecting unit includes an inversion circuit which inverts a terminal voltage of the sense resistor and a comparator which compares an output voltage of the inversion circuit with a set voltage.

The control apparatus for the electromagnetic inductive load according to a sixth aspect of the invention is configured so that the switching element is placed on a side of the ground to be subjected to low-side driving, the current sensing unit includes a sense resistor which is interposed in the regenerative current flow path, and the current detecting unit includes a first voltage drop circuit which drops a terminal voltage of the sense resistor on a side of the DC-power supply, a second voltage drop circuit which drops a terminal voltage of the sense resistor on a side of the switching element, and a comparator which compares an output voltage of the first voltage drop circuit with an output voltage of the second voltage drop circuit.

The control apparatus for the electromagnetic inductive load according to a seventh aspect of the invention is configured so that the switching element is placed on a side of the ground to be subjected to low-side driving, the current sensing unit includes a sense resistor which is interposed in the regenerative current flow path, and the current detecting unit includes a differential amplification circuit which obtains a deviation of a terminal voltage of the sense resistor on a side of the DC-power supply and a terminal voltage of the sense resistor on a side of the switching element, and a comparator which compares a differential output of the differential amplification circuit with a set voltage.

(1) According to the first to seventh aspects of the invention, it is possible to provide, in the control apparatus for an electromagnetic inductive load, a PWM control circuit which can perform the driving while automatically adjusting the duty cycle so as to attain the target current amount, without converting the sense value of the current to the duty cycle by means of a computing unit or the like.

Therefore, neither a computing unit (microcomputer or the like) nor A/D converter used for conversion to the duty cycle is not necessary, and the PWM control can be realized by a small size and economical configuration.

(2) According to the second aspect of the invention, the driving operation can be automatically switched to the DC driving during the voltage reduction period. Therefore, the electromagnetic inductive load is allowed to surely operate even at a low voltage, while avoiding an unstable situation in the boundary between the DC driving (=Duty 100%) and the PWM operation.

Moreover, the DC driving operation can be performed during the given time period after returning from voltage reduction. Therefore, it is possible to cope with also a load which requires a large current in the initial suction operation, such as an electromagnetic clutch or a relay with no problem.

(3) According to the third aspect of the invention, in the case where the power supply voltage is raised or the load inductance is low, the duty cycle during the PWM driving is small, but fixed at least to the duty cycle of the clock because of the logical sum with the clock signal. When the duty cycle of the clock is set to a value that is larger than a duty cycle in which the frequency changes, the current amount during the PWM driving does not become smaller than the minimum operating current of the load, and the load is always allowed to surely operate at a constant frequency.

When returning from a state where the power supply voltage is raised, the duty cycle of the PWM is larger than that of the clock signal, and returning to the PWM driving can be automatically performed by the logical sum unit. Therefore, a sensor unit which reads the duty cycle of the PWM is not required. Consequently, the PWM control of a constant frequency can be realized by an economical configuration.

(4) According to the fourth to seventh aspects of the invention, at the ON time in the PWM driving operation, no current flows through the current sensing unit, and therefore the period of energization to the current sensing unit is shorter than the total PWM driving period. Therefore, the power loss due to the current sensing unit (for example, the sense resistor) can be reduced.

Moreover, the sense resistor serving as the current sensing unit is not inserted in an ON-current path during the PWM driving of the switching element. During the ON-time of the switching element, therefore, a voltage drop is not generated by the sense resistor, and hence a failure due to such reduction of the power supply voltage does not occur.

(5) According to the sixth aspect of the invention, even in the circuit configuration where the terminal voltage of the sense resistor on the side of the switching element is always higher than that on the side of the DC power supply, because of the low-side driving, the voltage can be dropped by the first and second voltage drop circuits, and the comparator serving as the current detecting unit is enabled to normally operate.

BRIEF DESCRIPTION OF THE DRAWINGS

FIG. 1 shows the basic configuration of Embodiment 1 of the invention, in which FIG. 1(a) is a diagram of the total configuration, and FIG. 1(b) is a timing chart illustrating the operation of FIG. 1(a).

FIG. 5 shows a specific example of Embodiment 1 of the invention, in which FIG. 5(a) is a circuit diagram of main portions, and FIG. 5(b) is a timing chart illustrating the operation.

FIG. 19 shows timing charts illustrating a problem in an increase of the power supply voltage, in which FIG. 19(a) is a timing chart in the normal voltage, and FIG. 19(b) is a timing chart in the increase of the power supply voltage (without the compulsive clock PWM).

FIG. 23 shows timing charts of the PWM control in the apparatus of FIG. 20, in which FIG. 23(a) is a timing chart in the normal voltage, and FIG. 23(b) is a timing chart in the increase of the power supply voltage (with the compulsive clock PWM).

FIG. 25 shows views illustrating a method of determining the duty cycle in a conventional PWM control, in which FIG. 25(a) is a view showing time variations of an average current amount, and FIG. 25(b) is a view showing relationships between the average current amount and the duty cycle.

FIG. 26 is a view illustrating a problem of a conventional method in which the PWM is turned ON/OFF at the lower and upper limit values of the load current, respectively, in which FIG. 26(a) and FIG. 26(b) are charts showing relationships between the PWM frequency and the inductance of the load.

DETAILED DESCRIPTION OF THE EXEMPLARY EMBODIMENTS

Hereinafter, embodiments of the invention will be described with reference to the drawings. However, it should be understood that the invention is not limited the following embodiment examples.

Embodiment 1

Figure 1:
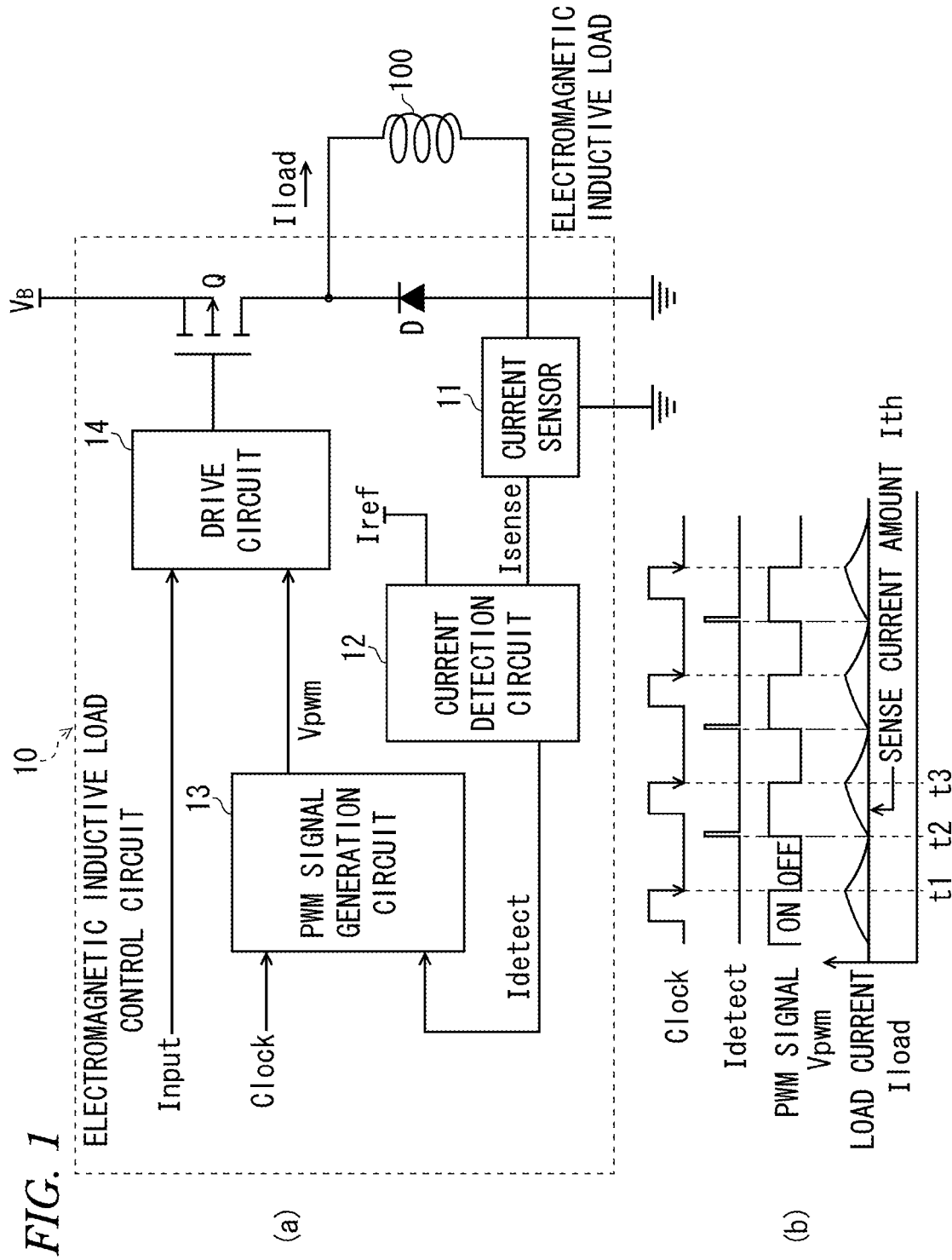

FIG. 1 shows the basic configuration of Embodiment 1 of the invention, in which FIG. 1(a) is a diagram of total configuration, and FIG. 1(b) is a timing chart of a PWM control in FIG. 1(a).

In FIG. 1(a) and FIG. 1(b), between a DC power supply VB and the ground, a switching device Q, an electromagnetic inductive load 100 such as an electromagnetic clutch or a relay coil, and a current sensor (current sensing unit) 11 are sequentially connected together in series, and a freewheel diode D in which the polarity is as illustrated is connected in parallel to the electromagnetic inductive load 100 and the current sensor (current sensing unit) 11.

The reference numeral 10 denotes an electromagnetic inductive load control circuit serving as the control apparatus for an electromagnetic inductive load of the invention, and the circuit includes: the current sensor (current sensing unit) 11 which senses a current flowing through the electromagnetic inductive load 100; a current detection circuit (current detecting unit) 12; a PWM signal generation circuit (PWM signal generating unit) 13; and a drive circuit (driving unit) 14 which drives and controls the switching device Q.

The switching device Q is a device which switches the current flowing through the electromagnetic inductive load 100, and configured, for example, by a semiconductor device such as an FET or a transistor. Although FIG. 1(a) and FIG. 1(b) show by way of example the high-side driving using an FET, it may be configured by a semiconductor device such as a transistor, and by the low-side driving.

The freewheel diode D constitutes a path through which a regenerative current flows during the OFF period in the PWM driving of the switching device Q.

The current sensor 11 is configured by a resistor and a shunt resistor, and monitors the current flowing through the electromagnetic inductive load 100. In the configuration of FIGS. 1(a) and 1(b), it is possible to monitor the current flowing through the electromagnetic inductive load 100, in both the ON/OFF periods of the PWM. Alternatively, a configuration in which only the regenerative current in the OFF period can be monitored as in Embodiments 2 and 3 that will be described later may be employed.

The current detection circuit 12 senses a target sense current amount Ith, from a sense signal Isense (sometimes referred to as a sense current) obtained by the current sensor 11 and a reference current Iref. At this time, Iref is set so that the sense current amount Ith is larger than the minimum operating current of the load.

The PWM signal generation circuit 13 generates a PWM signal Vpwm (sometimes referred to merely as an output voltage Vpwm) from the output signal Idetect (current detection signal) of the current detection circuit 12 and a clock signal.

The drive circuit 14 drives the switching device Q based on the PWM signal supplied from the PWM signal generation circuit 13.

Figure 2:
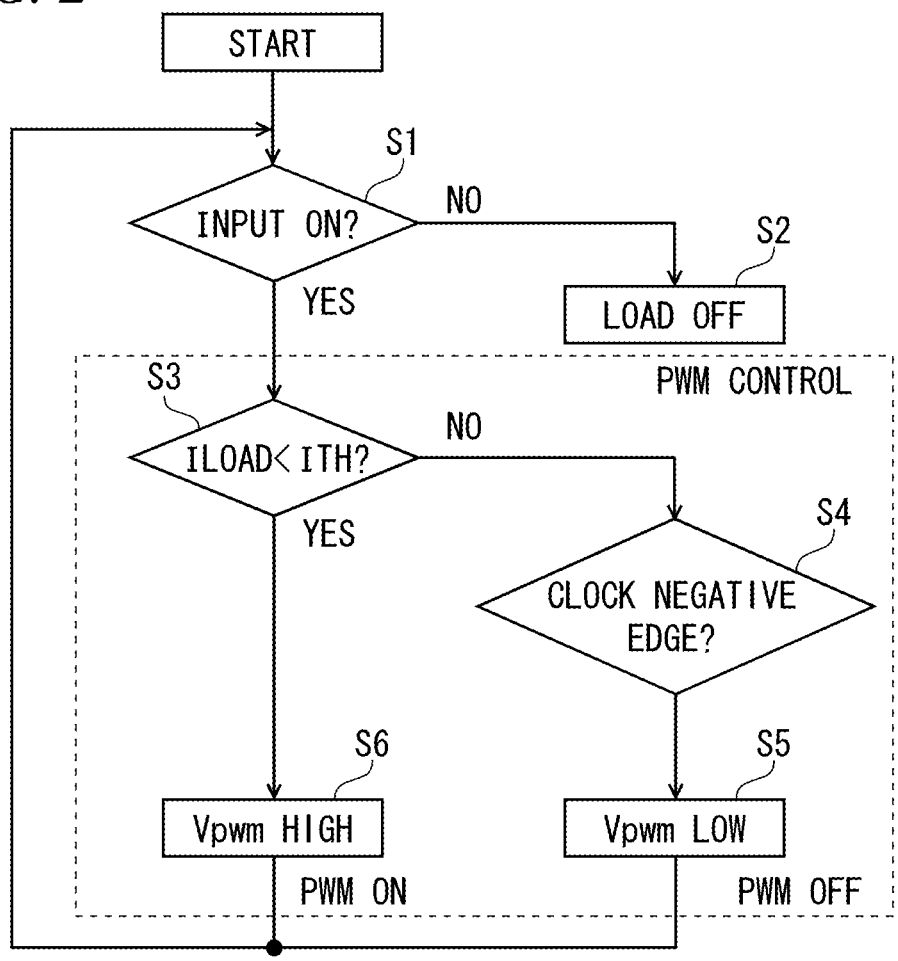
FIG. 2 is a flowchart of a PWM control in FIG. 1(a).

Next, the operation of the thus configured apparatus will be described with reference to a PWM control flowchart of FIG. 2, and a PWM control timing chart of FIG. 1(b).

First, it is determined in step S1 whether or not a control command (Input) is input to the drive circuit 14. If not input, the switching device Q is turned OFF (step S2).

If the control command is input, the switching device Q is in a state where it is PWM-controlled. During the ON period of the PWM operation, therefore, the current flows in the ordered route of the DC power supply VS, the switching device Q, the electromagnetic inductive load 100, the current sensor 11 and GND. Further, during the OFF period, the switching device Q is turned OFF, and the regenerative current flows through the electromagnetic inductive load 100 in the ordered route of the electromagnetic inductive load 100, the current sensor 11, GND, the freewheel diode D, and the electromagnetic inductive load 100.

Next, it is determined in step S3 whether or not the load current Iload is smaller than the target sense current amount Ith. If Iload<Ith is not satisfied, it is determined in step S4 whether or not the clock signal falls.

In the case where the clock signal falls, for example, as shown at time t1 in FIG. 1(b), the output voltage Vpwm of the PWM signal generation circuit 13 is set in step S5 to Low level, thereby turning OFF the load.

During the OFF period of the PWM, the regenerative current is generated by the energy accumulated in the electromagnetic inductive load 100, and the load current Iload is gradually reduced.

When, at time t2, the load current Iload becomes equal to or smaller than the target sense current amount Ith, the sense current Isense of the current sensor 11 is reduced to be smaller than the reference current Iref, and the current detection signal Idetect is output from the current detection circuit 12. In step S6, the PWM signal generation circuit 13 sets its output voltage Vpwm to High level, thereby turning ON the load. During the ON period of the PWM, the current is gradually increased by the current supply from the DC power supply VB.

Next, when the clock signal falls at time t3, the output voltage Vpwm of the PWM signal generation circuit 13 is set in step S5 to Low level in a similar manner as the case of time t1, thereby turning OFF the load.

Figure 3:
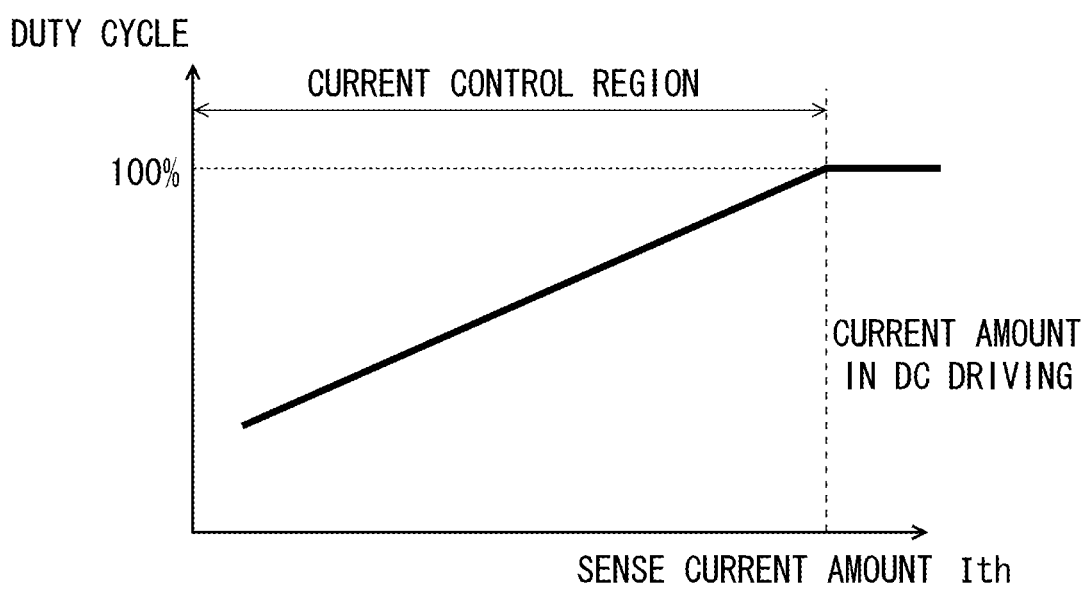
FIG. 3 is a graph illustrating a relationship between a sense current amount and a duty cycle in Embodiment 1 of the invention.

When the above-described operations at times t1 to t3 are repeated, the duty cycle corresponding to the target sense current amount Ith can be automatically adjusted as shown in FIG. 3 without calculating the duty cycle by means of a computing unit or the like.

FIG. 3 shows relationships between the sense current amount Ith and the duty cycle. The region where the duty cycle is smaller than 100% is the current control region due to the PWM. The figure shows that, when reaching 100%, switching to the DC driving is performed.

When the sense current amount Ith is adjusted so as to have a value which is equal to or larger than the minimum current of the electromagnetic inductive load 100, the load current is not reduced below this value, and an operation failure of the load such as clutch slipping or separation of relay contacts can be prevented from occurring.

Therefore, the current setting in which an excess margin is considered is not necessary, and hence a PWM control in which the power consumption is further reduced can be realized.

Moreover, the PWM frequency is equal to the frequency of the clock. Therefore, the PWM control can be performed at a constant frequency irrespective of the inductance of the electromagnetic inductive load 100. Consequently, it is possible to prevent abnormal noises from being generated. In a design, moreover, validations of the switching loss and noises with respect to frequency variations are not necessary.

The above-described operation may be performed while the relationships between High and Low of the output voltage Vpwm of the PWM signal generation circuit 13, and between rising and falling of the clock signal are reversed to each other.

Figure 4:
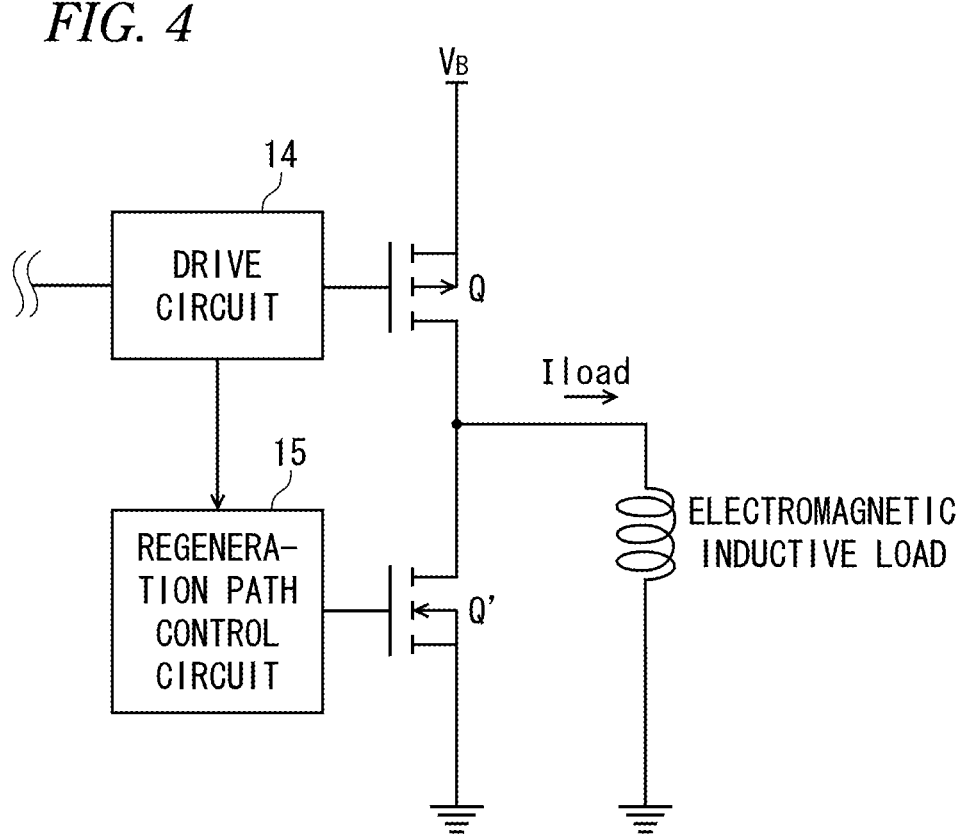
FIG. 4 is a diagram of main portions showing another example of a path through which a regenerative current in FIG. 1(a) flows.

The path through which the regenerative current flows may be configured so that a switching device Q' such as an FET is used as shown in FIG. 4 in place of the freewheel diode D in FIG. 1(a), and, only during the OFF period of the PWM, conduction is performed by the drive circuit 14 and a regeneration path control circuit 15.

In FIG. 4, the current sensor 11, the current detection circuit 12, and the PWM signal generation circuit 13 are not shown, but are configured in a similar manner as in FIG. 1(a).

Figure 5:
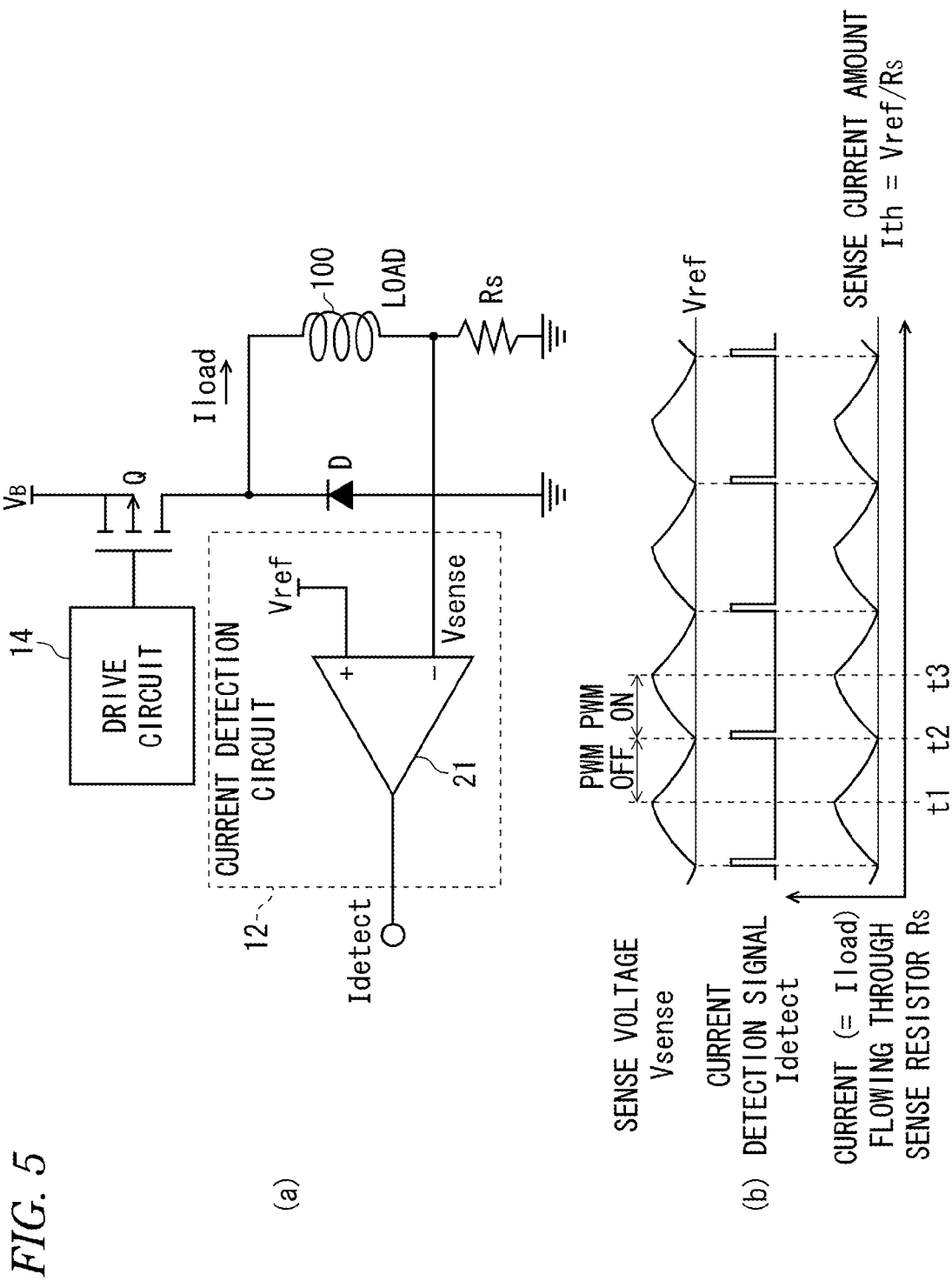

Specifically, the current sensor 11 and the current detection circuit 12 are configured as shown in FIG. 5(a).

Namely, a sense resistor Rs is connected between the electromagnetic inductive load 100 and the ground, a comparator 21 in which a reference voltage Vref is used as the non-inverting input is disposed in the current detection circuit 12, and the voltage Vsense (sometimes referred to as the sense voltage) of the common connection point of the sense resistor Rs and the electromagnetic inductive load 100 is used as the inverting input of the comparator 21.

In FIG. 5(a), the PWM signal generation circuit 13 is not shown, but is configured in a similar manner as in FIG. 1(a).

The operation of the apparatus of FIG. 5(a) is basically similar to that of FIG. 1(a). During the ON period of the PWM operation, namely, the current flows in the route of the DC power supply VB→the switching device Q→the electromagnetic inductive load 100→the sense resistor Rs→GND, and, during the OFF period, the switching device Q is turned OFF, and the regenerative current flows through the electromagnetic inductive load 100 in the route of the electromagnetic inductive load 100→the sense resistor Rs→GND→the freewheel diode D the electromagnetic inductive load 100.

In the case where the clock signal (not shown) supplied to the PWM signal generation circuit 13 falls, for example, at time t1 during the above-described PWM operation, the output voltage Vpwm of the PWM signal generation circuit 13 is set to Low level, thereby turning OFF the PWM.

During the OFF period of the PWM, the regenerative current is generated by the energy accumulated in the electromagnetic inductive load 100, and the current flowing through the sense resistor Rs, i.e., the load current Iload is gradually reduced.

When, at time t2, the current (=Iload) flowing through the sense resistor Rs becomes equal to or smaller than the target sense current amount Ith (=Vref/Rs), the sense voltage Vsense becomes lower than the reference voltage Vref, the current detection signal Idetect is output from the comparator 21, and the PWM signal generation circuit 13 sets its output voltage Vpwm to High level, thereby turning ON the PWM.

During the ON period of the PWM, the current is gradually increased by the current supply from the DC power supply VB. When the clock signal falls at time t3, the output voltage Vpwm of the PWM signal generation circuit 13 is set to Low level in a similar manner as the case of time t1, thereby turning OFF the load.

When the above-described operations at times t1 to t3 are repeated, the duty cycle corresponding to the target sense current amount Ith can be automatically adjusted without calculating the duty cycle by means of a computing unit or the like. Also in the apparatus of FIG. 5(a), it is possible to attain functions and effects which are similar to those attained in the apparatus of FIG. 1(a).

Embodiment 2

In the circuit of FIG. 5(a) in Embodiment 1, the current which is identical with the load current flows through the sense resistor Rs in both the ON/OFF periods of the PWM operation, and therefore electric power is always lost. This loss causes the sense resistor Rs to generate heat, thereby producing a problem in that the other circuits are adversely affected.

Since the sense resistor Rs is in the current path of the load, a voltage drop is generated by the sense resistor Rs at the ON time of the PWM, and there is a possibility that an operation failure of the load may occur when the power supply voltage is reduced and the duty cycle is raised to 100%.

One countermeasure is that the resistance of the sense resistor Rs is made small in order to reduce the loss and the voltage drop. In the countermeasure, however, there arises an adverse effect that the accuracy of sensing a current is impaired.

Figure 6:
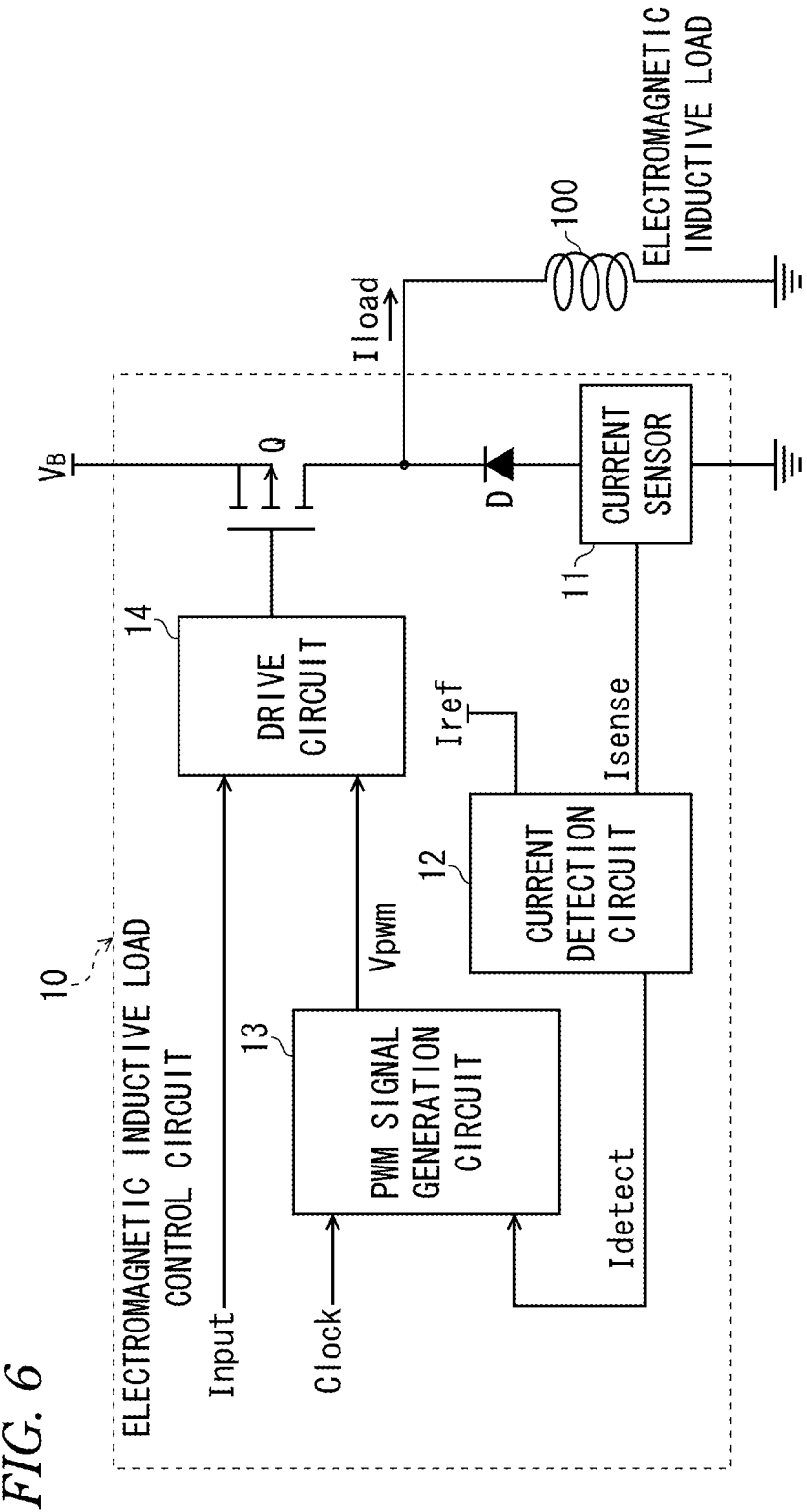
FIG. 6 is a diagram of the basic configuration of Embodiment 2 of the invention.

In Embodiment 2, as shown in FIG. 6, therefore, the current sensor 11 serving as a current sensing unit is disposed in the regenerative current flow path through which the regenerative current in the OFF time during the PWM driving of the switching device Q flows.

In FIG. 6, the components which are identical with those of FIG. 1(a) are denoted by the same reference numerals, and their description is omitted. FIG. 6 is different from FIG. 1(a) in that an end portion of the electromagnetic inductive load 100 is directly grounded, and the current sensor 11 is disposed between the freewheel diode D and the ground, and the other portions are configured in a similar manner as in FIG. 1(a).

Figure 7:
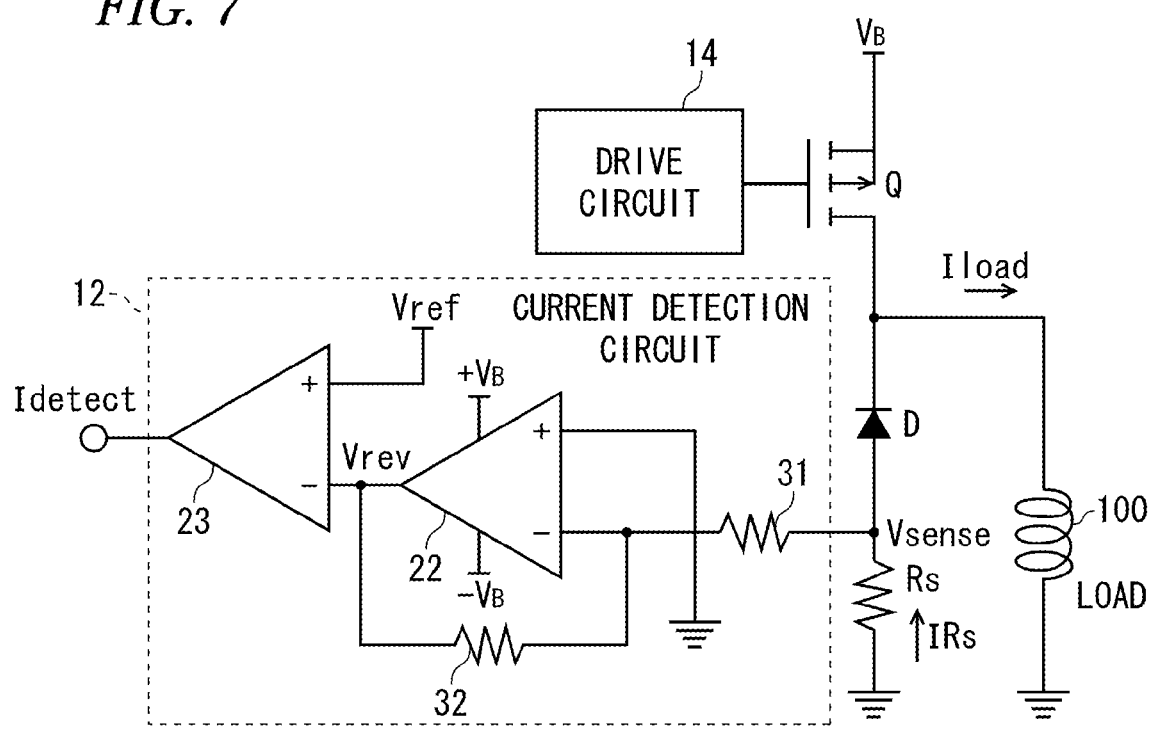
FIG. 7 is a diagram of main portions showing a specific example of Embodiment 2 of the invention.

Specifically, the current sensor 11 and the current detection circuit 12 in FIG. 6 are configured, for example, as shown in FIG. 7. Namely, the current sensor 11 is configured by the sense resistor Rs which is connected between the freewheel diode D and the ground.

The current detection circuit 12 is configured by: an inversion circuit formed by a resistor 31 in which one end is connected to the common connection point of the sense resistor Rs and the freewheel diode D, and the other end is connected to the inverting input end of an operational amplifier 22, the operational amplifier 22 in which the non-inverting input end is grounded, and a resistor 32 which is connected between the non-inverting input end and output end of the operational amplifier 22; and a comparator 23 in which the output voltage Vrev (the voltage that is obtained by inverting the sense voltage Vsense of the common connection point, sometimes referred to as the voltage inversion signal) of the operational amplifier 22 is used as the inverting input, and the reference voltage Vref is used as the non-inverting input.

In FIG. 7, the PWM signal generation circuit 13 is not shown, but is configured in a similar manner as in FIG. 6.

Figure 8:
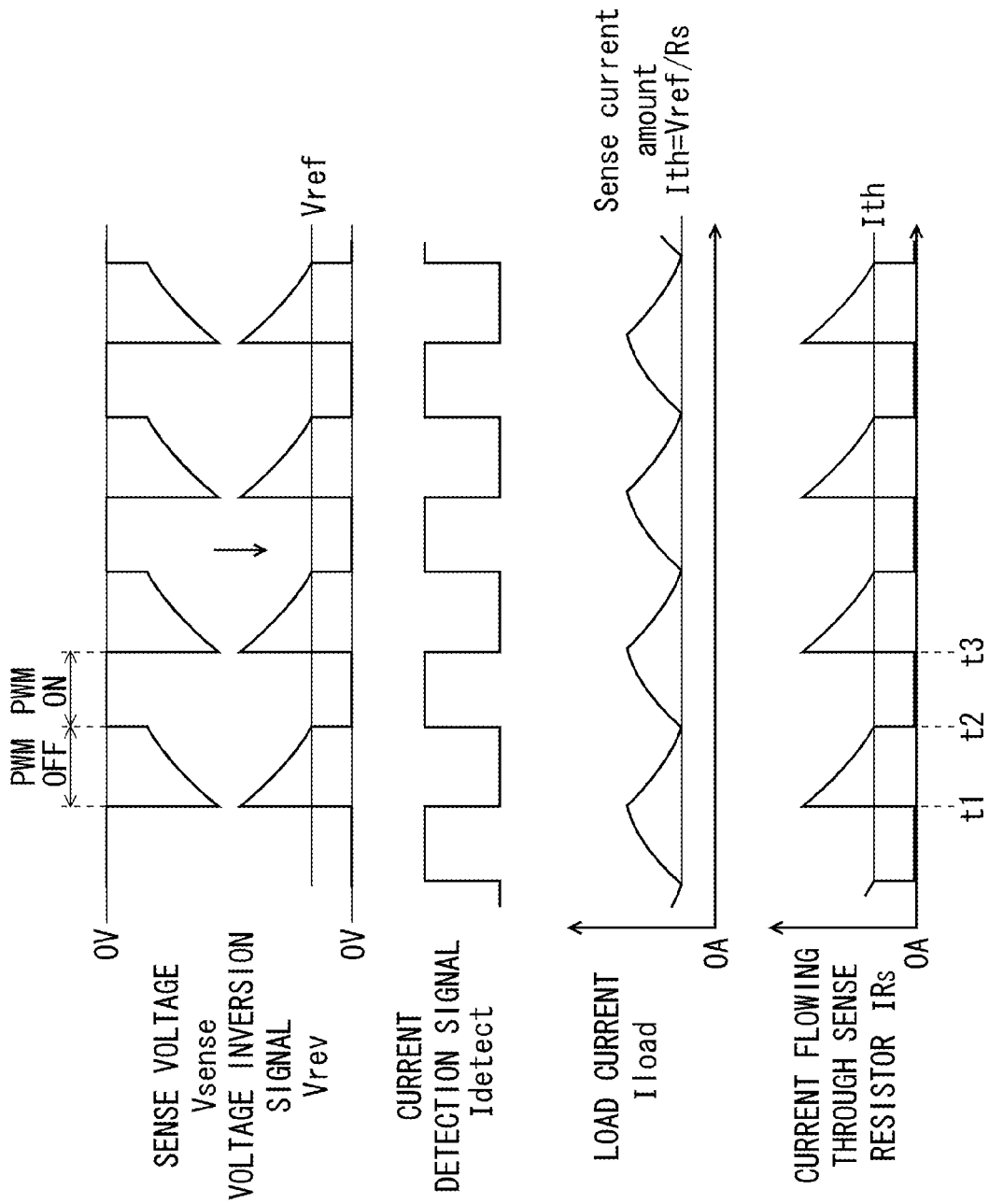
FIG. 8 is a timing chart illustrating the operation of FIG. 7.

Next, the operation of the thus configured apparatus will be described with reference to FIG. 8 showing operation waveforms in the current detection circuit 12.

During the ON period of the PWM operation, first, the current flows in the route of the DC power supply VB→the switching device Q→the electromagnetic inductive load 100→GND, and, during the OFF period, the switching device Q is turned OFF, and the regenerative current flows through the electromagnetic inductive load 100 in the route of the electromagnetic inductive load 100→GND→the sense resistor Rs→the freewheel diode D→the electromagnetic inductive load 100.

In the case where the clock signal (not shown) supplied to the PWM signal generation circuit 13 falls, for example, at time t1 during the above-described PWM operation, the output voltage Vpwm of the PWM signal generation circuit 13 is set to Low level, thereby turning OFF the PWM.

During the OFF period of the PWM, the regenerative current is generated by the energy accumulated in the electromagnetic inductive load 100, a negative voltage appears as the sense voltage Vsense across the sense resistor Rs, and is inverted by the operational amplifier 22, and the current flowing through the sense resistor Rs, i.e., the load current Iload is gradually reduced.

During the OFF period of the PWM, furthermore, the voltage inversion signal Vrev is larger than the reference voltage Vref, and therefore the current detection signal output from the comparator 23 is at Low level.

When, at time t2, the current flowing through the sense resistor Rs becomes equal to or smaller than the target sense current amount Ith, the voltage inversion signal Vrev becomes smaller than the reference voltage Vref, the current detection signal Idetect output from the comparator 23 is at High level, and the PWM signal generation circuit 13 sets its output voltage Vpwm to High level, thereby turning ON the PWM.

During the ON period of the PWM, the current is gradually increased by the current supply from the DC power supply VB. When the clock signal falls at time t3, the output voltage Vpwm of the PWM signal generation circuit 13 is set to Low level in a similar manner as the case of time t1, thereby turning OFF the PWM.

When the above-described operations at times t1 to t3 are repeated, the duty cycle corresponding to the target sense current amount Ith can be automatically adjusted without calculating the duty cycle by means of a computing unit or the like. Also in the apparatus of FIG. 7, it is possible to attain functions and effects which are similar to those attained in the apparatus of FIG. 1(a).

During the ON period in the PWM, moreover, no current flows through the sense resistor Rs. Therefore, the loss in the sense resistor Rs can be reduced while realizing the PWM control method in Embodiment 1 in which the sense current amount Ith is detected. At the ON time of the switching device Q, the power supply is applied only to the electromagnetic inductive load 100, and hence it is possible to prevent an operation failure of the load which may be caused when the power supply voltage is reduced, from occurring.

Embodiment 3

Figure 9:
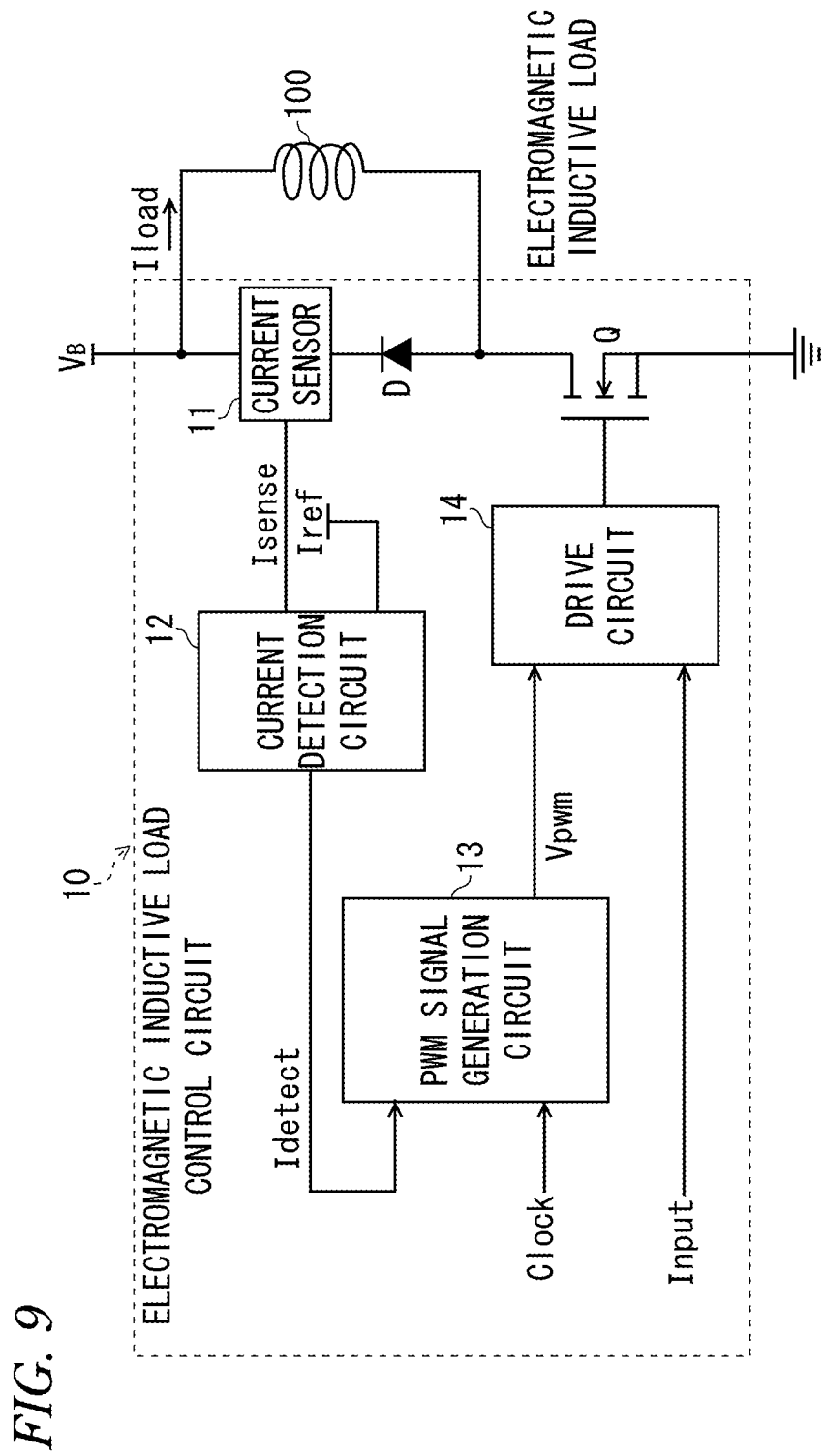
FIG. 9 is a diagram of the basic configuration of Embodiment 3 of the invention.

In Embodiment 3, the invention is applied to an apparatus configured by the low-side driving. FIG. 9 shows the basic configuration of Embodiment 3, and is different from FIG. 6 in that, between the DC power supply VB and the ground, the electromagnetic inductive load 100 and the switching device Q are sequentially connected together in series, and the freewheel diode D and the current sensor 11 are interposed in series in the regenerative current flow path of the electromagnetic inductive load 100, and the other portions are configured in the same manner as in FIG. 6.

Figure 10:
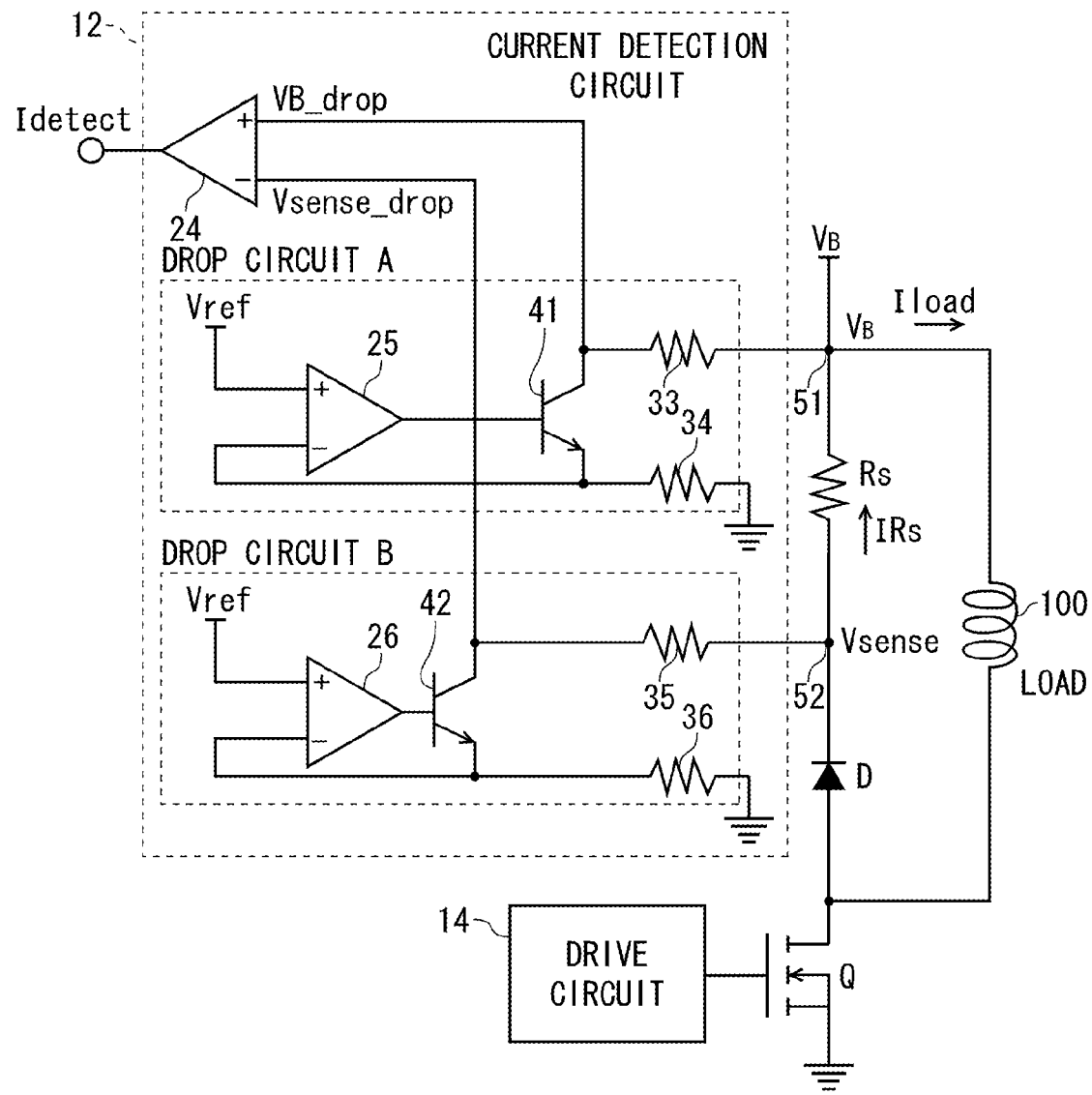
FIG. 10 is a diagram of main portions showing Specific example 1 of Embodiment 3 of the invention.

Specifically, the current sensor 11 and the current detection circuit 12 in FIG. 9 are configured, for example, as shown in FIG. 10. Namely, the current sensor 11 is configured by the sense resistor Rs which is connected between the freewheel diode D and the DC power supply.

The current detection circuit 12 is configured by: a drop circuit A (first voltage drop circuit) which drops the power supply voltage VB (the voltage of the DC power supply VB is sometimes referred to as the power supply voltage VB) of the common connection point 51 of the DC power supply and the sense resistor Rs; a drop circuit B (second voltage drop circuit) which drops the sense voltage Vsense of the common connection point 52 of the sense resistor Rs and the freewheel diode D; and a comparator 24 in which the output voltage VB-drop of the drop circuit A is used as the non-inverting input, and the output voltage Vsense-drop of the drop circuit B is used as the inverting input.

The drop circuit A includes: a transistor 41 in which the collector is connected to the common connection point 51 via a resistor 33, and also to the non-inverting input end of the comparator 24, and the emitter is grounded via a resistor 34; and a comparator 25 in which the reference voltage Vref is used as the non-inverting input, the inverting input end is connected to the emitter of the transistor 41, and the output end is connected to the base of the transistor 41.

The drop circuit B includes: a transistor 42 in which the collector is connected to the common connection point 52 via a resistor 35, and also to the non-inverting input end of the comparator 24, and the emitter is grounded via a resistor 36;

and a comparator 26 in which the reference voltage Vref is used as the non-inverting input, the inverting input end is connected to the emitter of the transistor 42, and the output end is connected to the base of the transistor 42.

The parameters of the devices of the drop circuit A and the drop circuit B are set so that, as shown in a drop voltage in FIG. 11 which will be described later, a potential difference of Vdif is generated between the output voltage VB-drop and output voltage Vsense-drop which are input to the comparator 24. As described later, therefore, the PWM control based on the target sense current amount Ith is enabled.

In FIG. 10, the PWM signal generation circuit 13 is not shown, but is configured in a similar manner as in FIG. 9.

Figure 11:
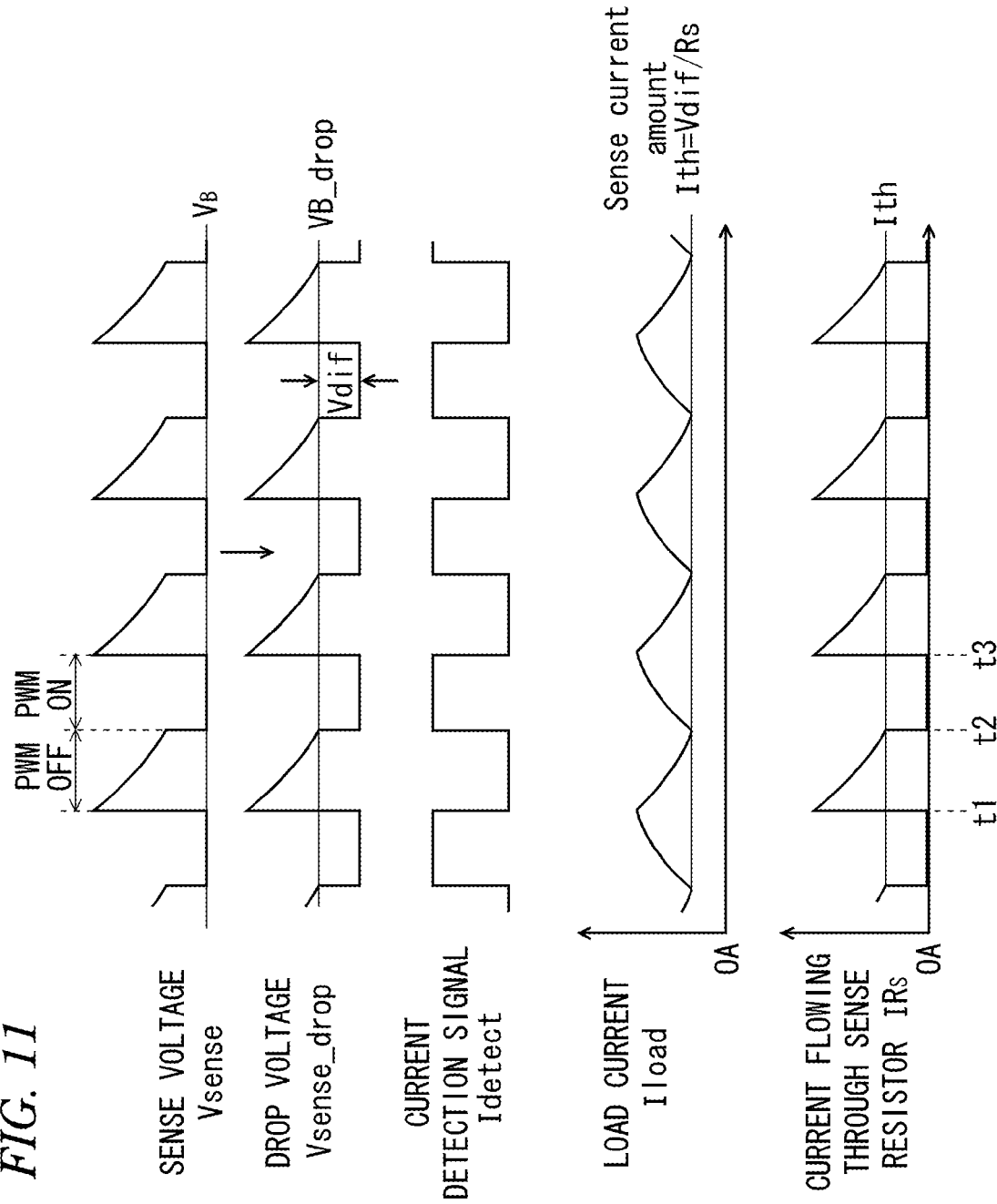
FIG. 11 is a timing chart illustrating the operation of FIG. 10.

Next, the operation of the thus configured apparatus will be described with reference to FIG. 11 showing operation waveforms in the current detection circuit 12.

In the case where the control command (Input in FIG. 9) is input to the drive circuit 14, first, the switching device Q is in a state where it is PWM-controlled. During the ON period of the PWM operation, therefore, the current flows in the route of the DC power supply VB→the electromagnetic inductive load 100→the switching device Q→GND, and, during the OFF period, the switching device Q is turned OFF, and the regenerative current flows through the electromagnetic inductive load 100 in the route of the electromagnetic inductive load 100 the freewheel diode D→the sense resistor Rs→the electromagnetic inductive load 100.

In the case where the clock signal (not shown) supplied to the PWM signal generation circuit 13 falls, for example, at time t1 during the above-described PWM operation, the output voltage Vpwm of the PWM signal generation circuit 13 is set to Low level, thereby turning OFF the PWM.

During the OFF period of the PWM, the regenerative current is generated by the energy accumulated in the electromagnetic inductive load 100, the output voltage Vsense-drop in which the terminal voltage of the sense resistor Rs is dropped by the regenerative current becomes higher than the output voltage VB-drop in which the power supply voltage VB is dropped, and the current flowing through the sense resistor Rs, i.e., the load current Iload is gradually reduced. During the OFF period of the PWM, furthermore, the output voltage Vsense-drop is higher than VB-drop, and therefore the current detection signal Idetect output from the comparator 23 is at Low level.

When, at time t2, the current flowing through the sense resistor Rs becomes equal to or smaller than the target sense current amount Ith (=Vdif/Rs), the output voltage Vsense-drop in which the sense voltage is dropped becomes lower than the output voltage VB-drop in which the power supply voltage is dropped, the current detection signal Idetect which is output from the comparator 24 becomes High level, and the PWM signal generation circuit 13 sets its output voltage Vpwm to High level, thereby turning ON the PWM.

During the ON period of the PWM, the current is gradually increased by the current supply from the DC power supply VB. When the clock signal falls at time t3, the output voltage Vpwm of the PWM signal generation circuit 13 is set to Low level in a similar manner as the case of time t1, thereby turning OFF the load.

When the above-described operations at times t1 to t3 are repeated, the duty cycle corresponding to the target sense current amount Ith can be automatically adjusted without calculating the duty cycle by means of a computing unit or the like. Also in the apparatus of FIG. 10, it is possible to attain functions and effects which are similar to those attained in the apparatuses of FIGS. 1(*a*) and 7.

In the low-side drive circuit of FIG. 10, the sense voltage Vsense of the common connection point 52 which is on the upstream side of the regenerative current that is caused to flow by the energy accumulated in the electromagnetic inductive load 100 is always higher than the power supply voltage VB of the common connection point 51 on the power supply side. In the case where these voltages are directly introduced into the current detection circuit 12, therefore, there is a problem in that the elements constituting the circuit are adversely affected or broken. In FIG. 10, however, the drop circuits A, B are disposed, and therefore the problem does not occur.

Figure 12:
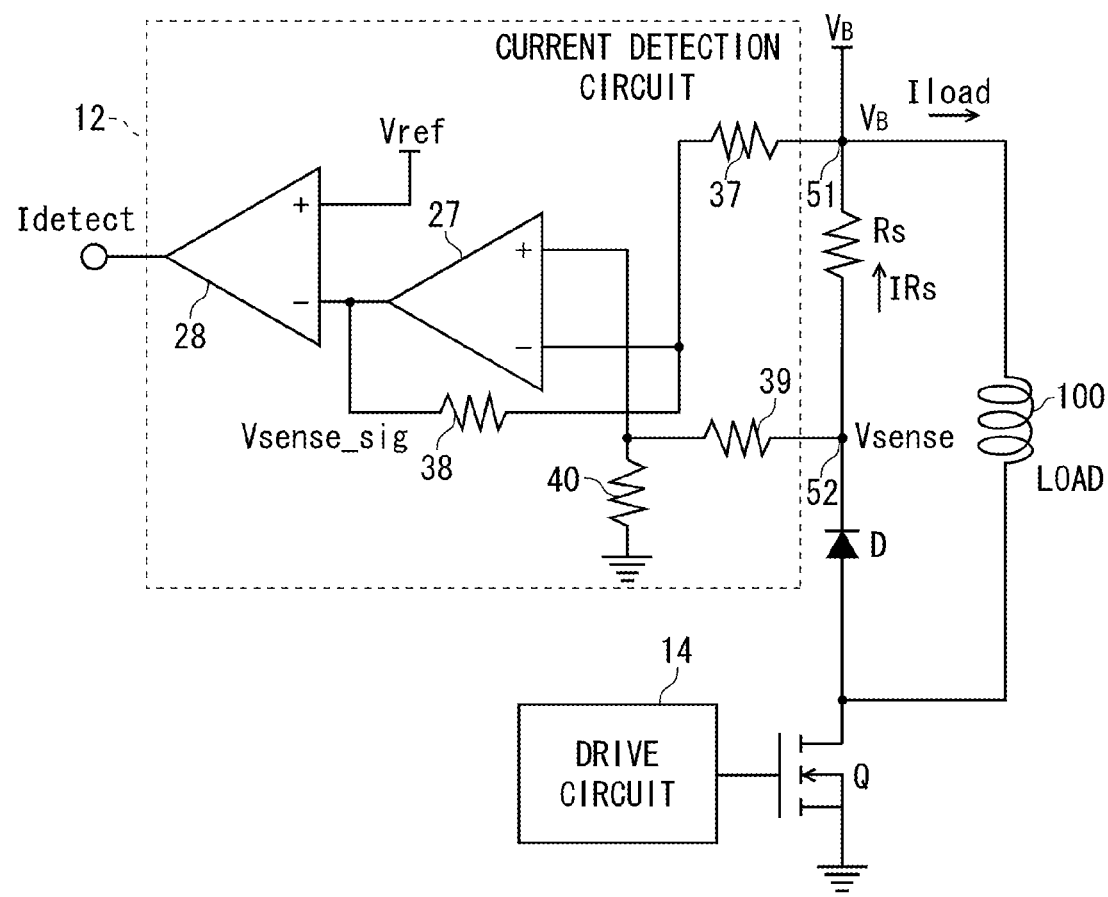
FIG. 12 is a diagram of main portions showing Specific example 2 of Embodiment 3 of the invention.

FIG. 12 shows another specific example of Embodiment 3. FIG. 12 is different from FIG. 10 in that the current detection circuit 12 is configured, in place of the drop circuits A, B and the comparator 24, by: resistors 37, 38 which divide the power supply voltage VB of the common connection point 51, and which guide the divided voltage to the inverting input end of an operational amplifier 27; resistors 39, 40 which divide the sense voltage Vsense of the common connection point 52, and which guide the divided voltage to the non-inverting input end of the operational amplifier 27; the operational amplifier 27; and a comparator 28 in which the reference voltage Vref is used as the non-inverting input, and the output voltage Vsense-sig of the operational amplifier 27 is used as the inverting input. The other portions are configured in a similar manner as in FIG. 10.

In FIG. 12, the PWM signal generation circuit 13 is not shown, but is configured in a similar manner as in FIG. 9.

Figure 13:
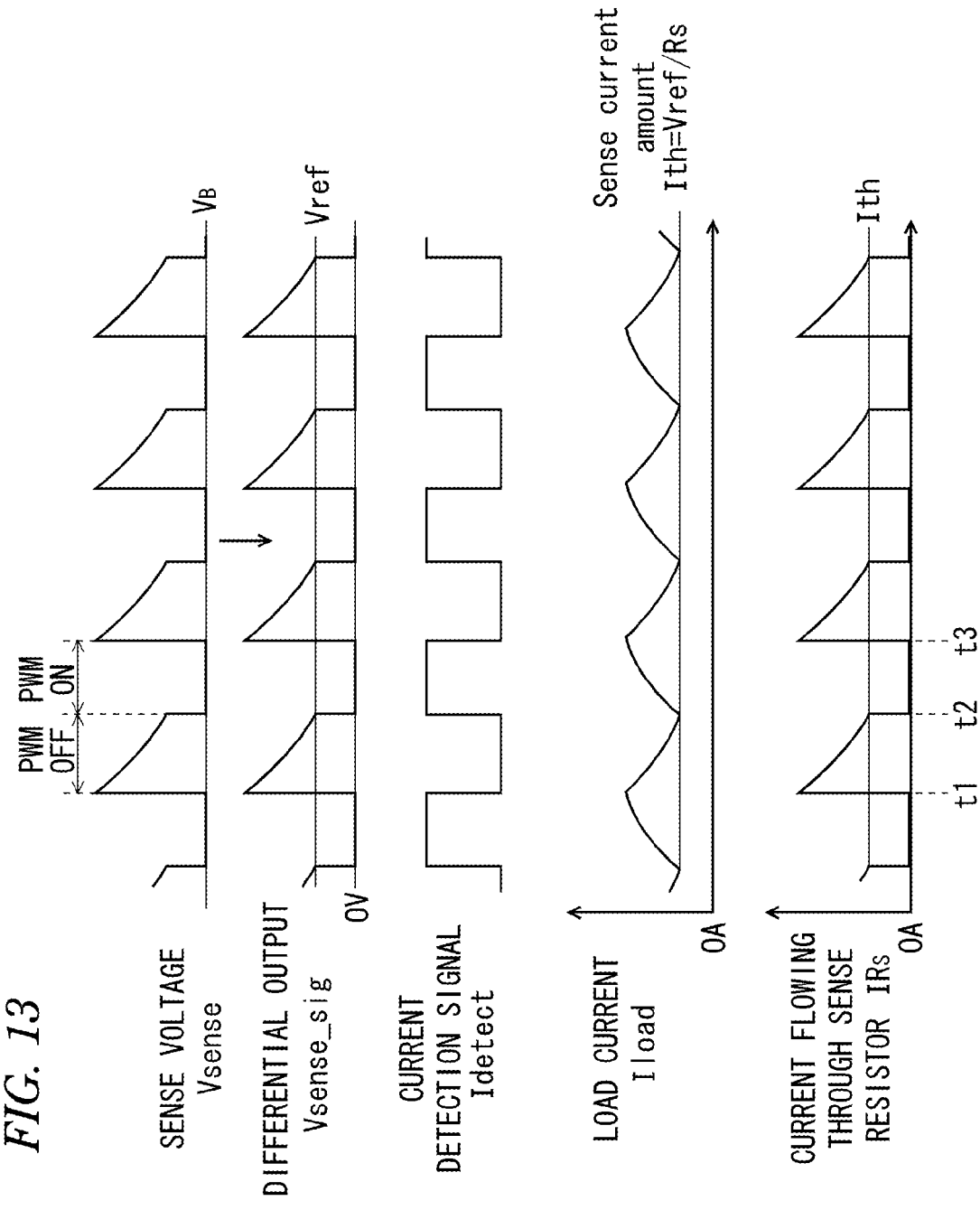
FIG. 13 is a timing chart illustrating the operation of FIG. 12.

Next, the operation of the thus configured apparatus will be described with reference to FIG. 13 showing operation waveforms in the current detection circuit 12.

In the case where the control command (Input in FIG. 9) is input to the drive circuit 14, first, the switching device Q is in a state where it is PWM-controlled. During the ON period of the PWM operation, therefore, the current flows in the route of the DC power supply VB→the electromagnetic inductive load 100→the switching device Q→GND, and, during the OFF period, the switching device Q is turned OFF, and the regenerative current flows through the electromagnetic inductive load 100 in the route of the electromagnetic inductive load 100→the freewheel diode D→the sense resistor Rs→the electromagnetic inductive load 100.

In the case where the clock signal (not shown) supplied to the PWM signal generation circuit 13 falls, for example, at time t1 during the above-described PWM operation, the output voltage Vpwm of the PWM signal generation circuit 13 is set to Low level, thereby turning OFF the PWM.

During the OFF period of the PWM, the regenerative current is generated by the energy accumulated in the electromagnetic inductive load 100, the sense voltage Vsense which is generated by the regenerative current becomes higher than the power supply voltage VB of the common connection point 51, and the current flowing through the sense resistor Rs, i.e., the load current Iload is gradually reduced.

During the OFF period of the PWM, furthermore, the output voltage Vsense-drop of the operational amplifier 27 is higher than the reference voltage Vref, and therefore the current detection signal Idetect output from the comparator 28 is at Low level.

When, at time t2, the current flowing through the sense resistor Rs becomes equal to or smaller than the target sense current amount Ith (=Vref/Rs), the output voltage Vsense-sig becomes lower than the reference voltage Vref, the current detection signal Idetect which is output from the comparator 28 becomes High level, and the PWM signal generation circuit 13 sets its output voltage Vpwm to High level, thereby turning ON the PWM.

During the ON period of the PWM, the current is gradually increased by the current supply from the DC power supply VB. When the clock signal falls at time t3, the output voltage Vpwm of the PWM signal generation circuit 13 is set to Low level in a similar manner as the case of time t1, thereby turning OFF the load.

When the above-described operations at times t1 to t3 are repeated, the duty cycle corresponding to the target sense current amount Ith can be automatically adjusted without calculating the duty cycle by means of a computing unit or the like. Also in the apparatus of FIG. 12, it is possible to attain functions and effects which are similar to those attained in the apparatuses of FIGS. 1(a) and 7.

Moreover, the apparatus of FIG. 12 requires a reduced number of components of the current detection circuit 12, and therefore can be economically configured.

Embodiment 4

Figure 14:
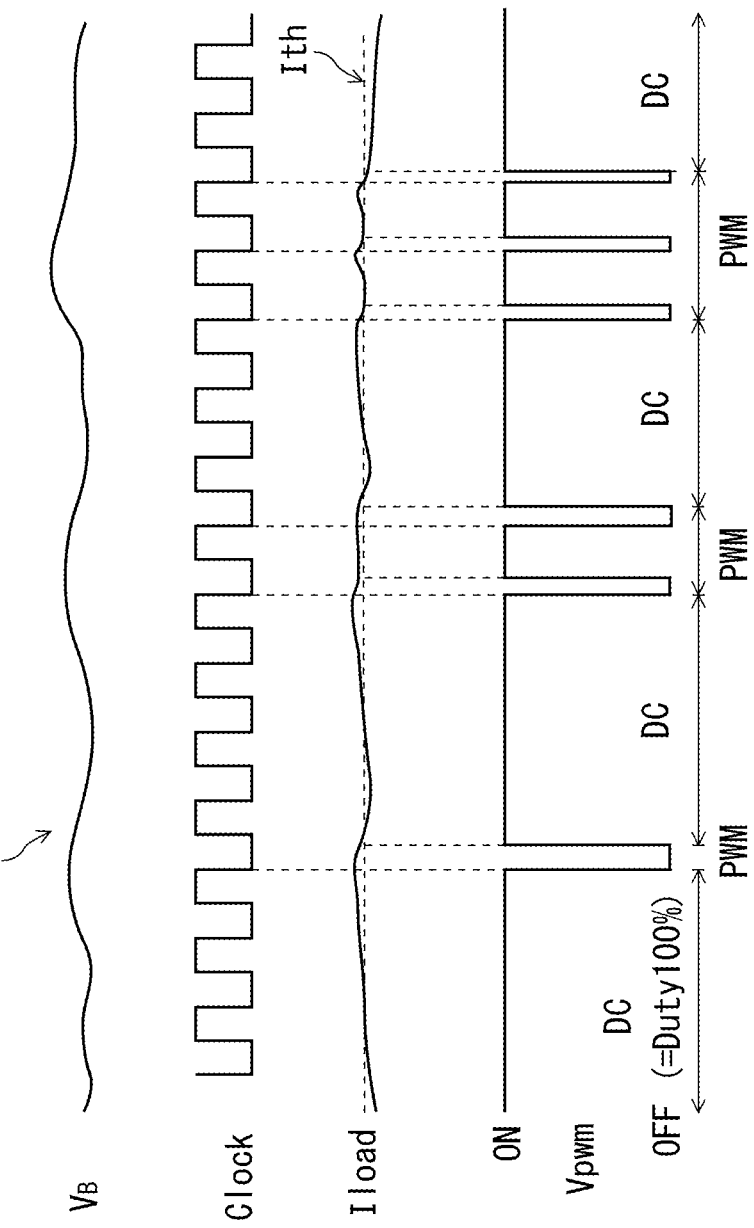
FIG. 14 is an operation waveform chart in the vicinity of a duty cycle of 100% illustrating a problem which may be caused in minute variation of the power supply voltage in the apparatus of FIG. 1(a).

In the apparatus of FIG. 1(a), in the case where the power supply voltage VB is once reduced during the PWM driving and an operation failure of the electromagnetic inductive load 100 such as disengagement of a clutch or separation of contacts of a relay occurs, for example, a current amount which is necessary for sucking the clutch or the contacts cannot be ensured, and the apparatus does not have means for returning the load to the normal state. When the duty cycle is in the vicinity of 100% as shown in FIG. 14, the operation becomes unstable. For example, the DC driving and the PWM driving are frequently switched over by a small change of the power supply voltage VB, and problems may be caused such as that an audible sound is generated from the load.

Figure 15:
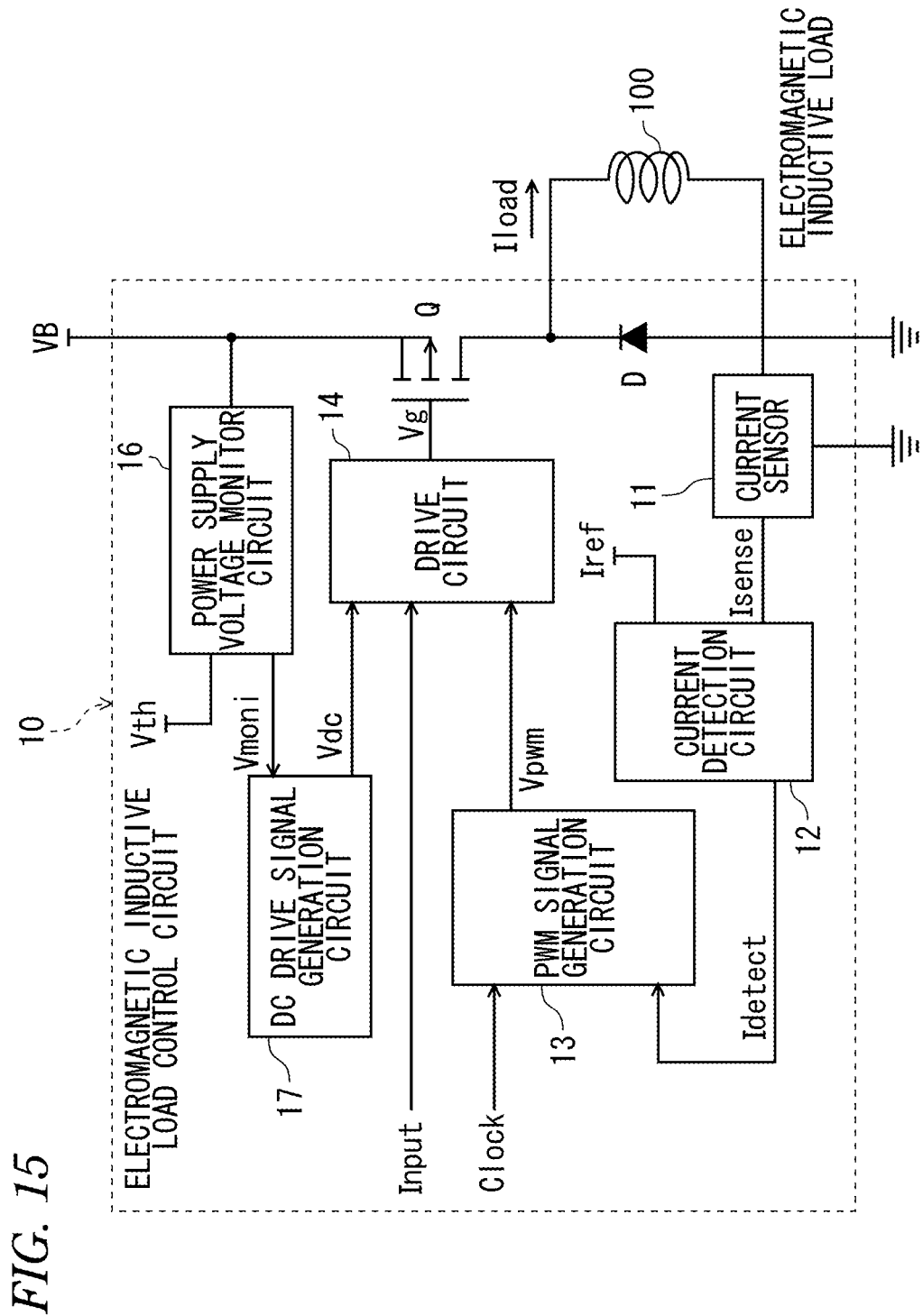
FIG. 15 is a diagram showing Embodiment 4 of the invention.

As shown in FIG. 15, therefore, Embodiment 4 is configured so that, in place of the PWM control, the DC drive control is performed during a power supply voltage reduction period, and a given time period after the returning of the power supply voltage reduction.

FIG. 15 is different from FIG. 1(a) in that a power supply voltage monitor circuit 16 which monitors the power supply voltage VB, and which outputs a voltage monitor signal Vmoni (voltage reduction signal) that, during a period when the power supply voltage VB is reduced to or below a power supply voltage threshold Vth, is, for example, at Low level, and a DC drive signal generation circuit 17 which receives the voltage monitor signal Vmoni output from the power supply voltage monitor circuit 16, and which, during the power supply voltage reduction period, and a given time period after the power supply voltage reduction is returned, outputs a DC drive signal Vdc that is always at High level, to the drive circuit 14 are further disposed. The other portions are configured in a similar manner as in FIG. 1(a).

Figure 16:
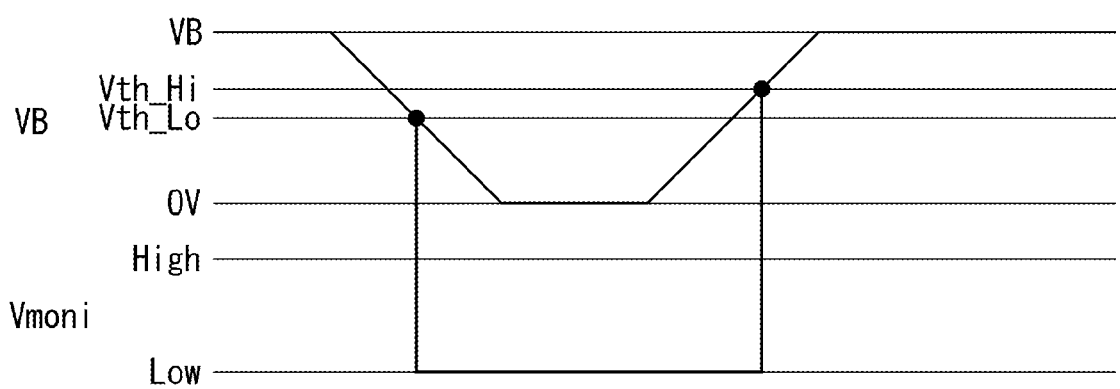
FIG. 16 is a voltage waveform chart showing hysteresis characteristics of a power supply voltage monitor circuit 16 in FIG. 15.

The power supply voltage monitor circuit 16 is a circuit which monitors the power supply voltage VB while comparing it with the power supply voltage threshold Vth, and which outputs the signal (Vmoni) for switching the method of controlling the load. The power supply voltage threshold Vth is provided with hysteresis as shown in FIG. 16.

As the power supply voltage threshold Vth of the power supply voltage monitor circuit 16, namely, two values or a threshold Vth-Hi and a threshold Vth-Lo which is lower than it are set. It is configure so that, in the case where the power supply voltage is reduced, when the power supply voltage VB is reduced to the threshold Vth-Lo, the voltage monitor signal Vmoni is set to Low level, and, when the power supply voltage reduction is returned and the power supply voltage VB reaches the threshold Vth-Hi, the voltage monitor signal Vmoni is set to High level.

The DC drive signal generation circuit 17 outputs the signal (Vdc) for causing the load to be DC driven for a given time period, and, as its driving time period, a time period which is sufficiently long for sucking the clutch, the contacts, or the like of the electromagnetic inductive load 100 is set.

Figure 17:
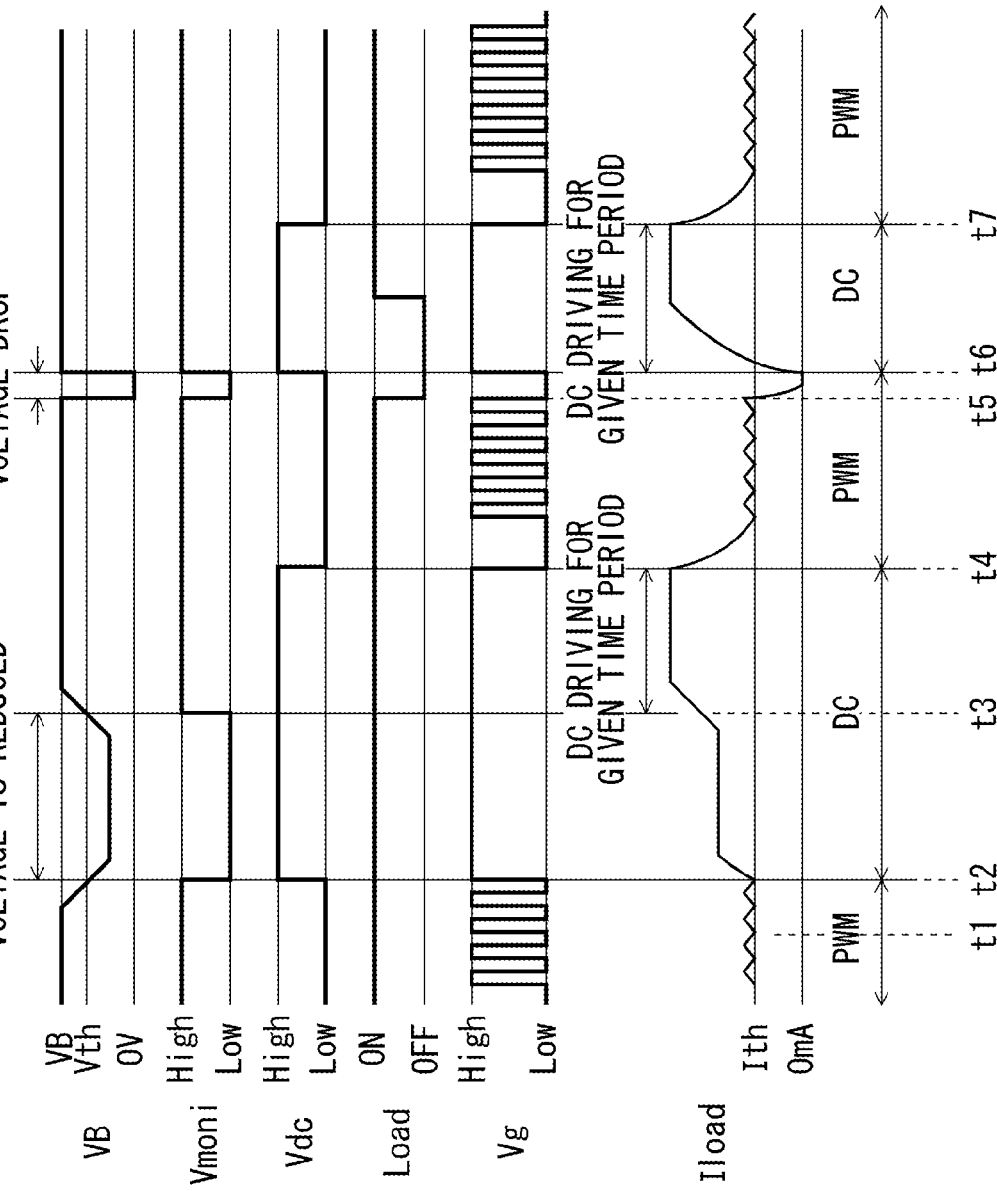
FIG. 17 is a timing chart illustrating the operation of FIG. 15.
Figure 18:
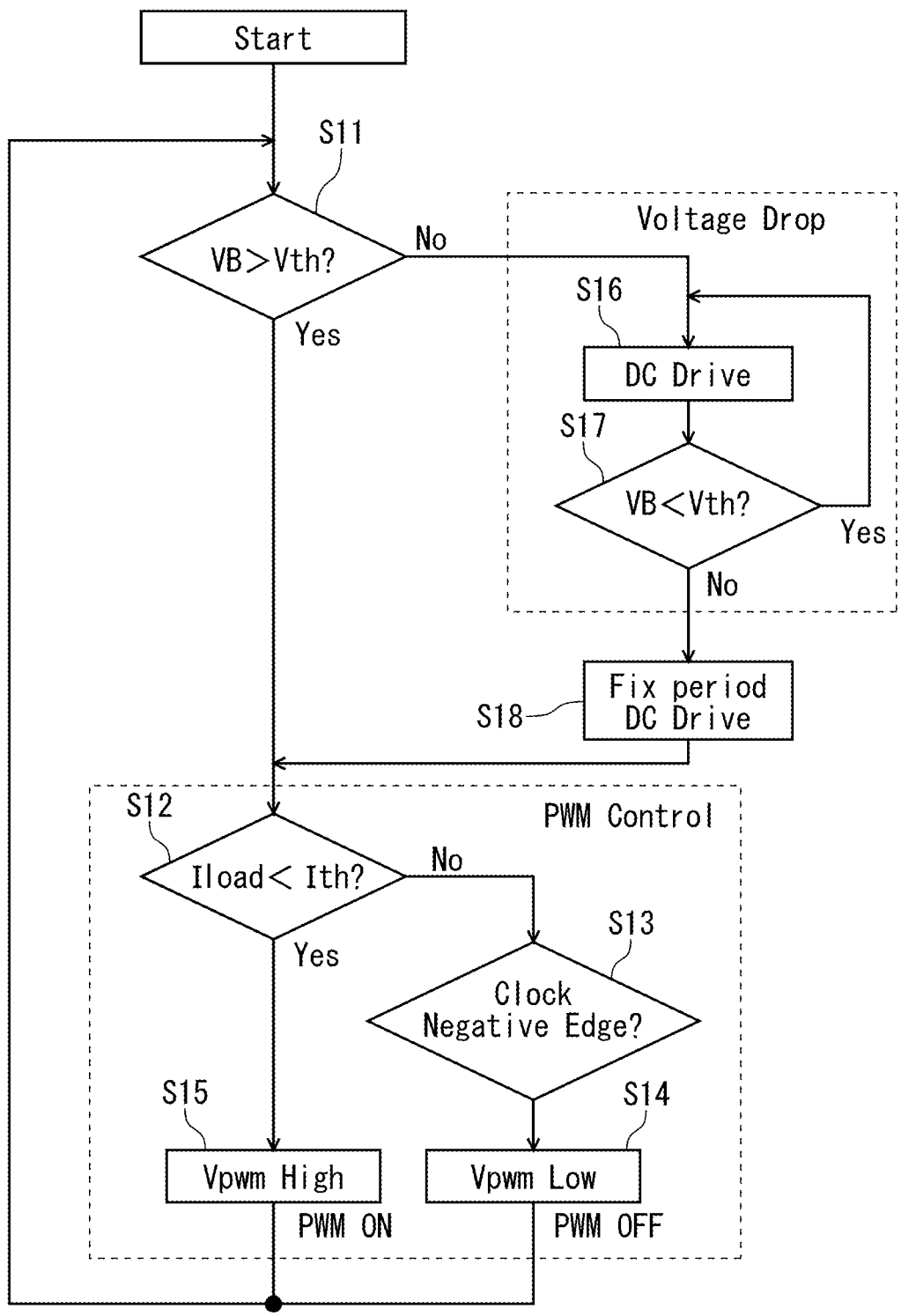
FIG. 18 is a flowchart of the control shown in FIG. 15.

Next, the operation of the thus configured apparatus will be described with reference to a timing chart of FIG. 17, and a PWM control flowchart of FIG. 18.

The process (steps S1, S2 in FIG. 2) according to the existence of the control command (Input) is similar to the case of Embodiment 1. Hereinafter, description will be made starting from the state where the PWM control is performed.

First, it is determined in step S11 whether the power supply voltage threshold Vth is lower than the power supply voltage VB which is monitored by the power supply voltage monitor circuit 16. In the case where there is no reduction of the power supply voltage (i.e., VB>Vth) as at time t1 in FIG. 17, for example, the PWM control process of steps S12 to S15 is performed.

The processes of steps S12 to S15 are identical with those of steps S3 to S6, respectively, and therefore their description is omitted. As described with reference to FIGS. 1(a) to 3, the process in which, when the load current Iload is smaller than the target sense current amount Ith, the PWM is turned ON, and that in which the PWM is turned OFF at falling of the clock signal are repeated, so that the duty cycle corresponding to the target sense current amount Ith can be automatically adjusted.

At time t2, when the power supply voltage VB is reduced to the power supply voltage threshold Vth, the voltage monitor signal Vmoni output from the power supply voltage monitor circuit 16 is set to Low level, and the DC drive signal Vdc output from the DC drive signal generation circuit 17 is set to High level, so that the PWM driving is compulsively switched to the DC driving (step S16).

Namely, a gate signal Vg output from the drive circuit 14 is maintained to High level, the load current Iload to the electromagnetic inductive load 100 can be ensured, and the load is allowed to surely operate even in a state where the power supply voltage is reduced.

Also during a given time period (until time t4) which is after returning (the result of the determination of VB<Vth in step S17 is NO) of the power supply voltage reduction at time t3, the DC drive signal Vdc maintains High level, and therefore the DC driving is continued until time t4 which is after the returning of the power supply voltage (step S18).

Therefore, it is possible to sufficiently cope with also a case where a large current is required in the initial suction operation, such as in an electromagnetic clutch or a relay.

When an instantaneous voltage drop occurs at time t5 in the DC power supply VB, the load current Iload disappears, and the electromagnetic inductive load 100 is turned OFF. When the power supply is returned at time t6 to the power supply voltage threshold Vth or higher, however, the DC drive signal Vdc and the gate signal Vg are at High level during a time period from the time or time t6 to time t7, and the DC driving is performed. Therefore, the load can be returned to the normal state.

Embodiment 4 is not limited to be configured as shown in FIG. 15, and can be applied to the apparatuses of FIGS. 5(a) to 7, 9, 10, and 12. Also in this case, functions and effects which are similar to those described above are attained.

Embodiment 5

The duty cycle during the PWM driving is determined mainly on the power supply voltage and the inductance of the load. When the power supply voltage is reduced, for example, it is controlled so that the duty cycle is increased and the final amount of the load current is maintained.

Figure 19:
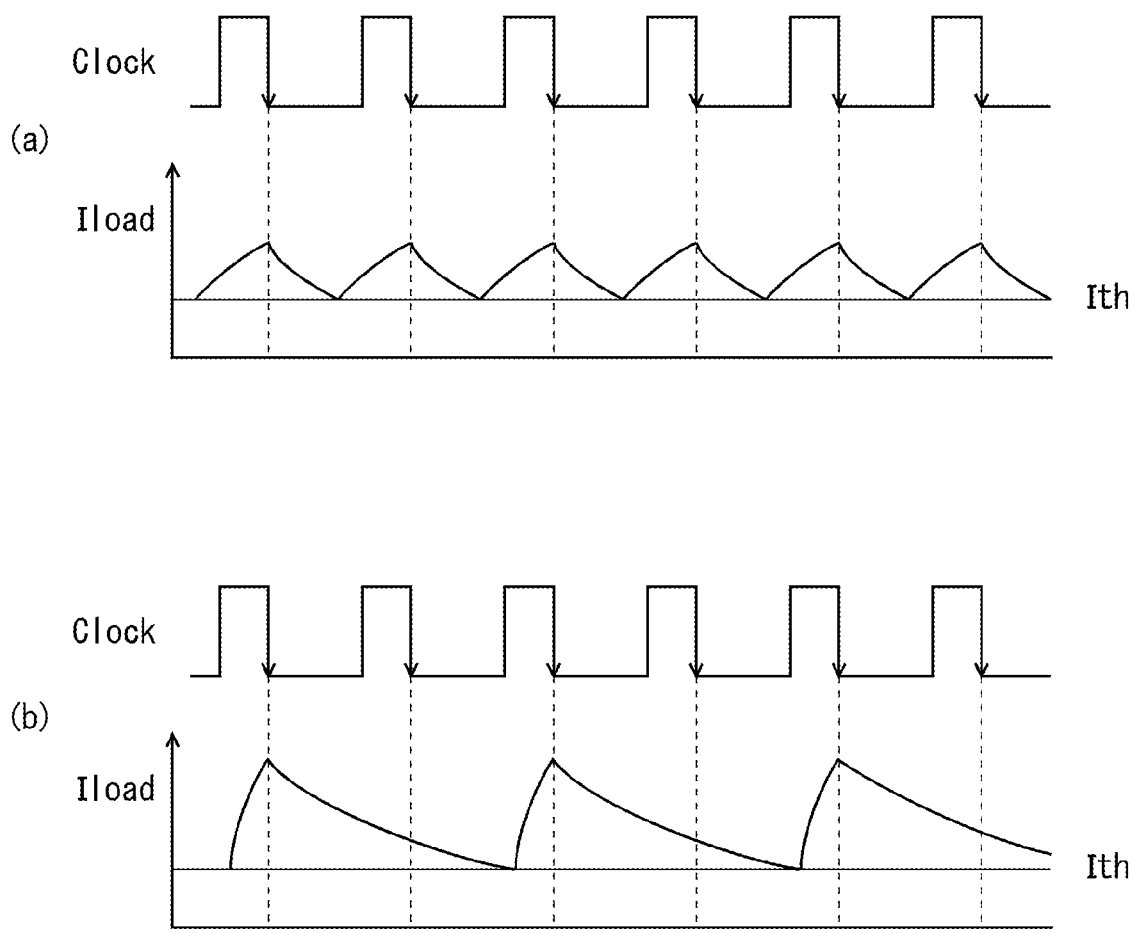

On the other hand, in the apparatus of FIG. 1(a), when the duty cycle is large, for example, the PWM control can be performed at a constant frequency as shown in FIG. 19(a), but, when the power supply voltage is raised, or when the inductance of the load is small, the duty cycle is reduced, with the result that there arises a problem in that, as shown in FIG. 19(b), stabilization is attained at a frequency which is lower than the set frequency. In this case, when the PWM frequency is in the audible frequency range, there is a possibility that an audible sound is generated from the load (a coil or the like).

FIGS. 19(a) and 19(b) are timing charts of the PWM control in which the current detection signal Idetect and PWM signal Vpwm in the PWM control timing chart of FIG. 1(b) are not shown.

Therefore, Embodiment 5 is configured so that the PWM (the PWM in which the duty cycle is changed) due to the current sense and the PWM (the PWM in which the duty cycle is fixed) due to the clock signal are ORed (logically summed).

Figure 20:
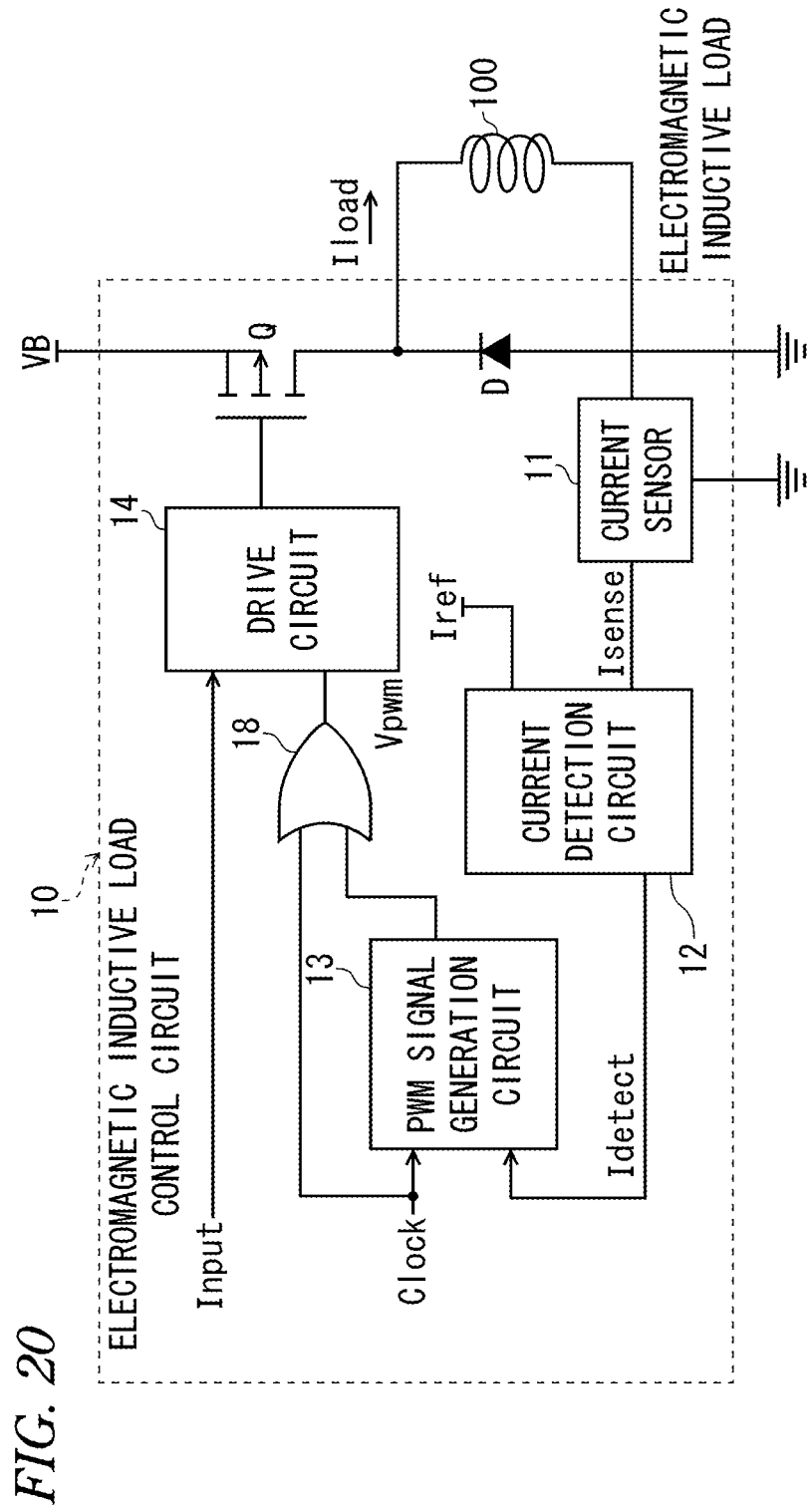
FIG. 20 is a diagram showing Embodiment 5 of the invention.

FIG. 20 shows the apparatus of Embodiment 5, and is different from FIG. 1(a) in that an OR gate 18 which logically sums the output of the PWM signal generation circuit 13 and the clock signal, and which supplies the output as the PWM signal Vpwm to the drive circuit 14 is disposed. The other portions are configured in the same manner as in FIG. 1(a). The duty cycle of the clock signal is previously set to a value which is larger than a duty cycle in which the frequency changes.

Figure 21:
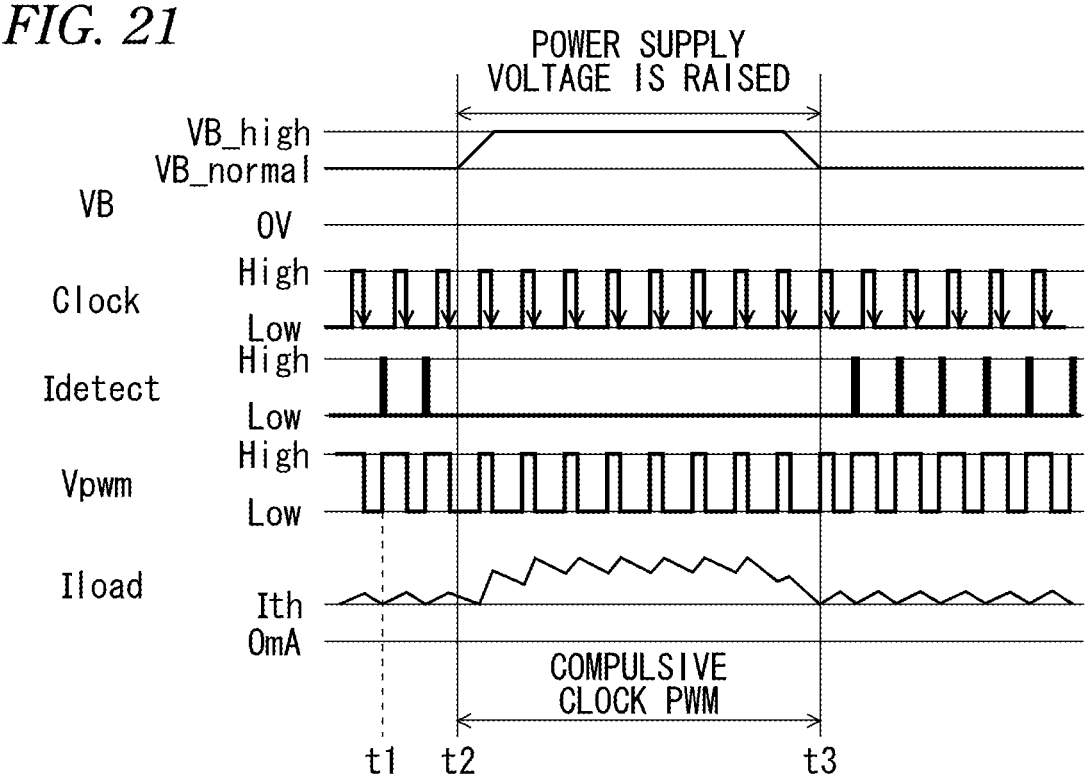
FIG. 21 is a timing chart illustrating the operation of FIG. 20.

Next, the operation of the thus configured apparatus will be described with reference to a timing chart of FIG. 21.

The process (steps S1, S2 in FIG. 2) according to the existence of the control command (Input) is similar to the case of Embodiment 1. Hereinafter, description will be made starting from the state where the PWM control is performed.

In the case where the power supply voltage VB is normal (VB-normal) as shown, for example, at time t1, first, the PWM due to the current sense is performed. Namely, the processes in which, when the load current Iload is smaller than the target sense current amount Ith, the PWM is turned ON, and that in which the PWM is turned OFF at falling of the clock signal are repeated, whereby the duty cycle corresponding to the target sense current amount Ith can be automatically adjusted.

When the power supply voltage is raised (VB-high) during the time period from time t2 to time t3, the duty cycle is gradually reduced, the load current Iload is not reduced to the target sense current amount Ith, and the current detection signal Idetect is not output from the current detection circuit 12.

At this time, in the circuit of FIG. 1(a) in which the OR gate 18 is not disposed, the PWM signal Vpwm cannot be set to High level during a time period when the power supply voltage is raised, and therefore the PWM control is stabilized at a frequency which is lower than the set frequency.

By contrast, in the circuit of FIG. 20, the clock signal is the output of the OR gate 18 even when the output of the PWM signal generation circuit 13 remains at Low level. Therefore, the PWM signal Vpwm which is synchronized with the clock signal is output to the drive circuit 14, and the electromagnetic inductive load 100 is enabled to always operate at a constant frequency (compulsive clock PWM).

The current amount during the PWM driving does not become lower than the minimum operating current of the load, and hence a sure load operation can be ensured.

Next, when the raising of the power supply voltage is returned at time t3 and the power supply voltage is returned to the normal voltage, the duty cycle of the PWM is larger than that of the clock signal, and the operation is automatically returned to the PWM driving due to the current sense.

Figure 22:
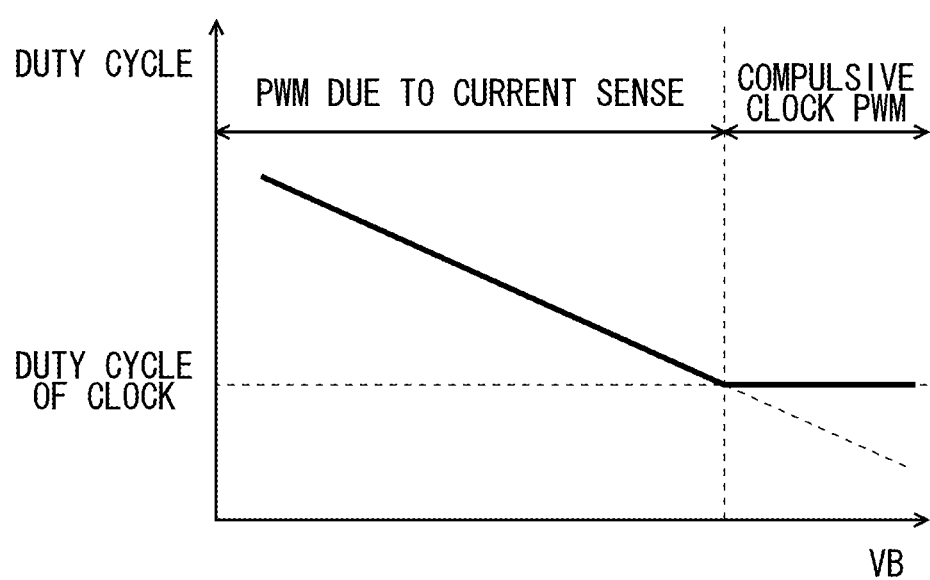
FIG. 22 is a characteristics diagram illustrating relationships between the power supply voltage and the duty cycle in Embodiment 5.

FIG. 22 is a view showing a region where the PWM due to the current sense and the compulsive clock PWM are switched over, together with relationships between the power supply voltage and the duty cycle.

Figure 23:
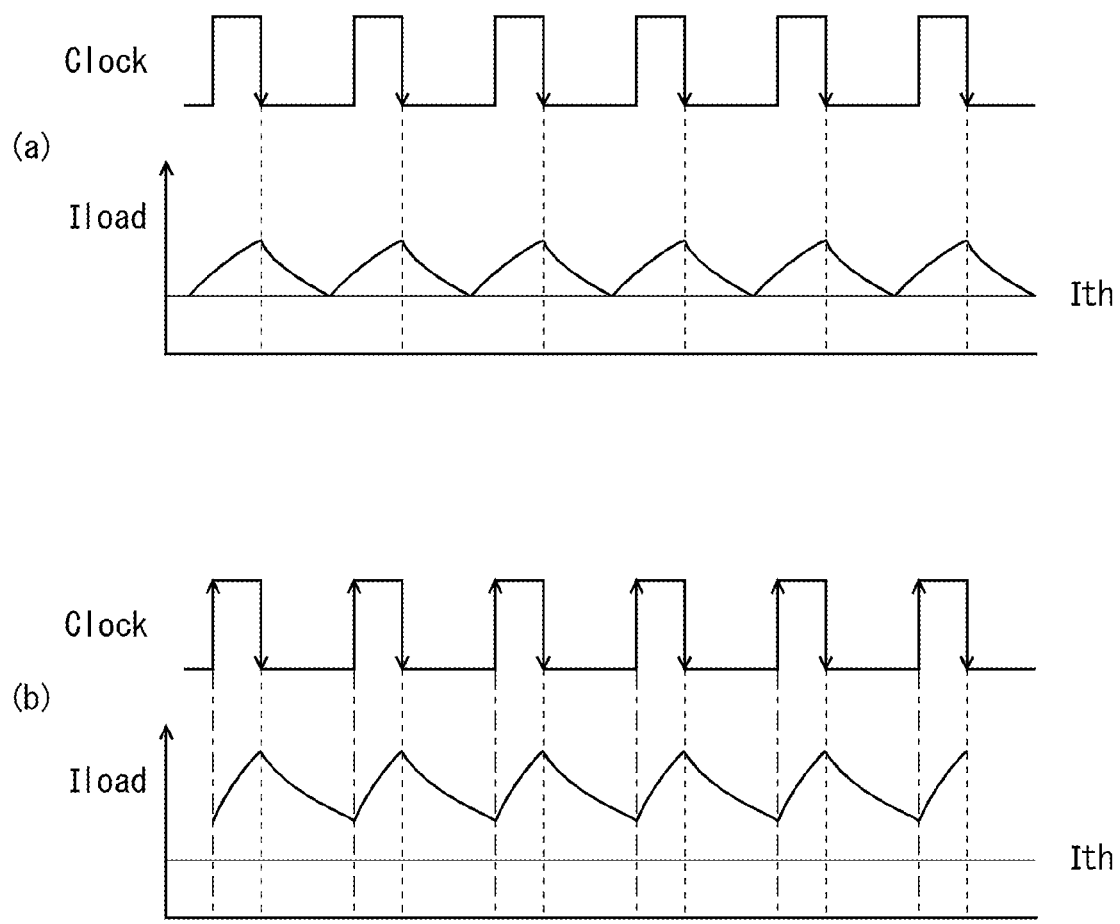
Figure 24:
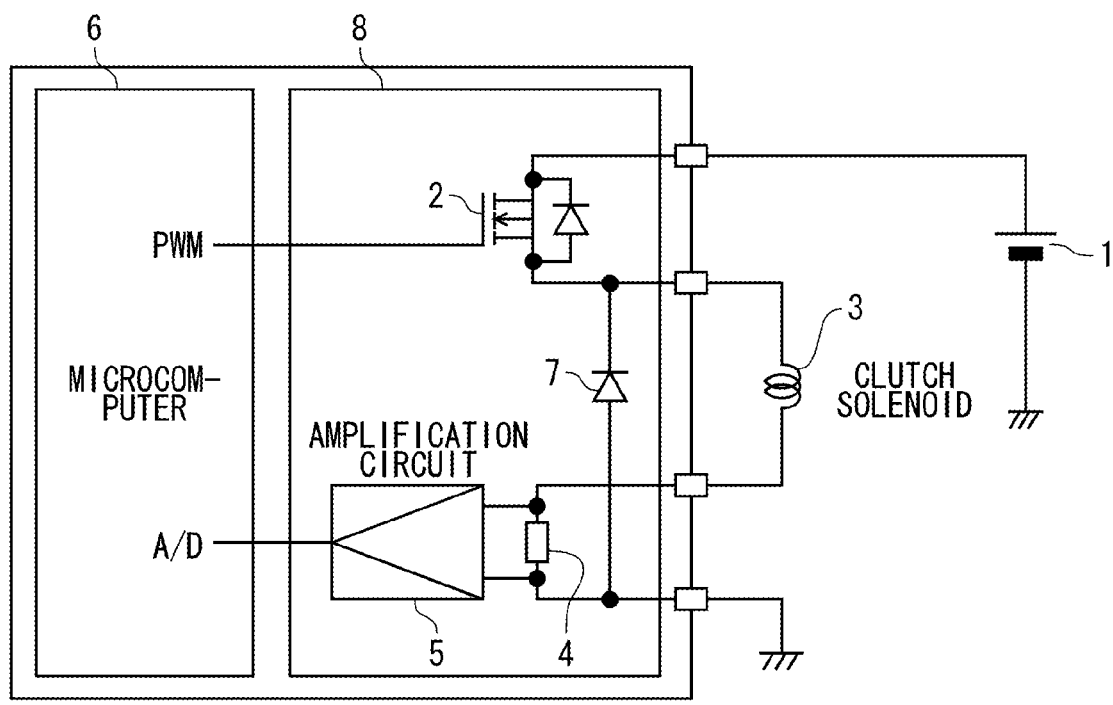
FIG. 24 is a diagram showing an example of a conventional apparatus which PWM-controls an electromagnetic inductive load.
Figure 25:
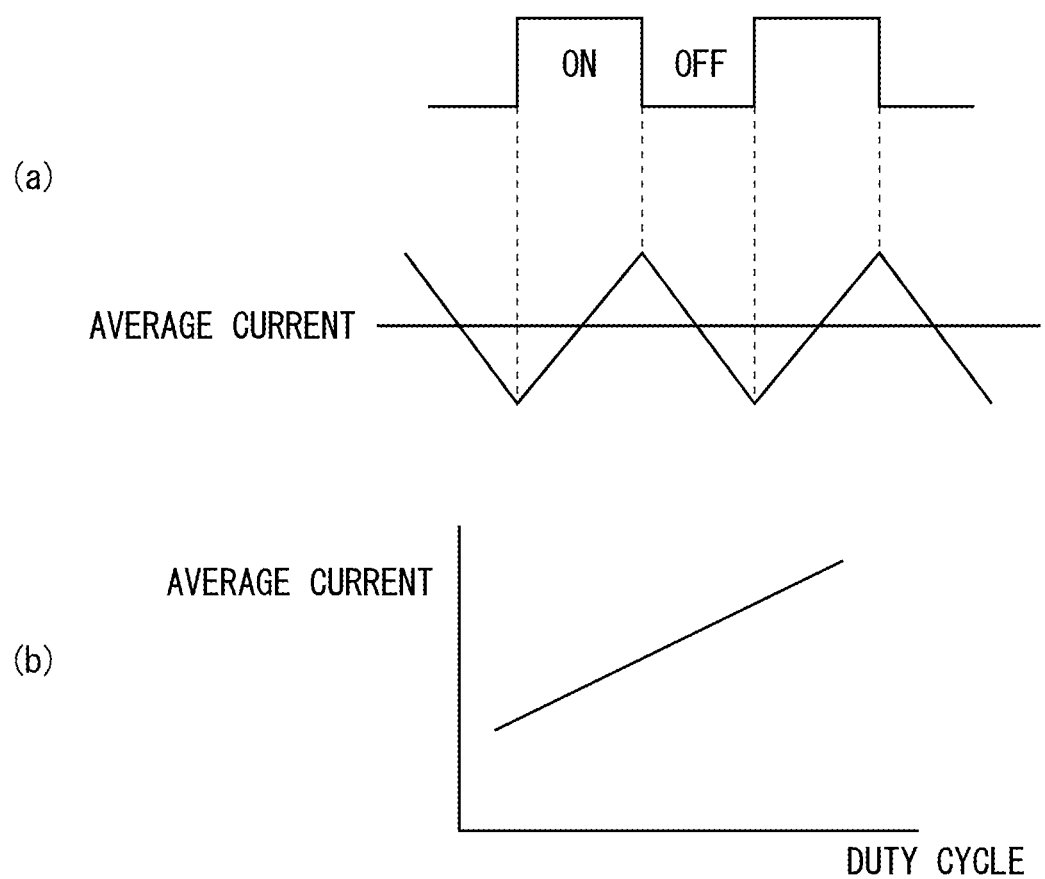
Figure 26:
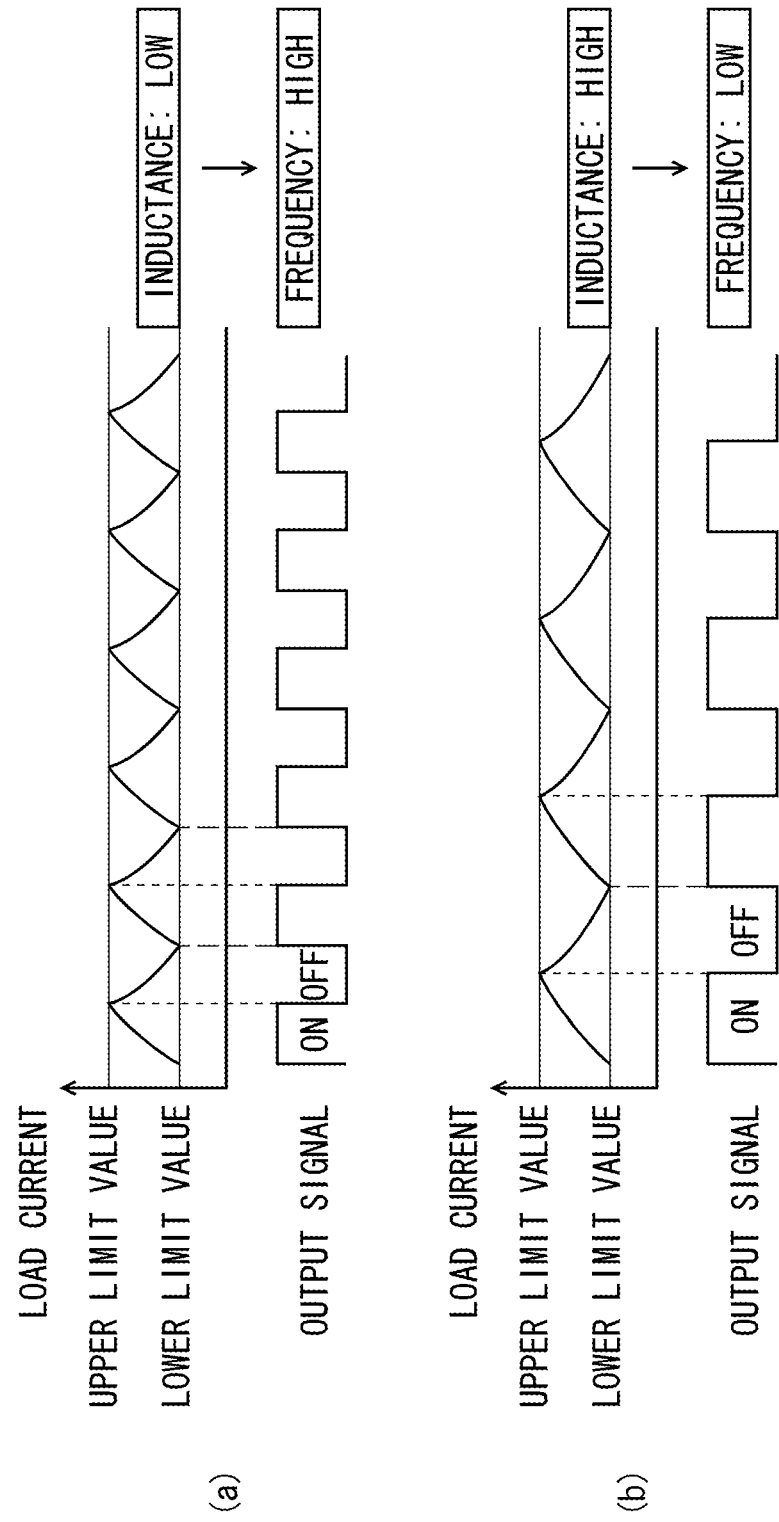

FIGS. 23(a) and 23(b) are timing charts in the normal voltage and the increase of the power supply voltage in the apparatus of FIG. 20, respectively in which the current detection signal Idetect and PWM signal Vpwm in the PWM control timing chart are not shown.

According to the embodiment, a sensor unit which reads the duty cycle of the PWM is not required, and hence the PWM control of a constant frequency can be realized by an economical configuration.

Although the invention has been described in detail and with reference to the specific embodiments, it is obvious to those skilled in the art that various changes and modifications can be made without departing from the spirit and scope of the invention.

What is claimed is:

1. A control apparatus for an electromagnetic inductive load, the control apparatus being a circuit in which a switching element that is PWM-controlled and the electromagnetic inductive load are connected together in series between a DC power supply and a ground, and comprising:
   a current sensing unit which senses a regenerative current in an OFF time in a PWM driving operation of the switching element;
   a current detecting unit which outputs a current detection signal when a sense current sensed by the current sensing unit becomes smaller than a target current amount;
   a PWM signal generating unit which receives a clock signal of a given frequency and the current detection signal output from the current detecting unit, and which generates a PWM signal that is at a high level or a low level during a period from an output of a signal indicating a sense that the current detection signal becomes smaller than the target current amount, to rising or falling of the clock signal; and
   a driving unit which is disposed between the PWM signal generating unit and the switching element, and which controls to drive the switching element.

2. The control apparatus for the electromagnetic inductive load according to claim 1, comprising:
   a power supply voltage monitoring unit which monitors a voltage of the DC power supply, and which outputs a voltage reduction signal during a period when the power supply voltage is reduced to or below a set voltage; and
   a DC drive signal generating unit which receives the voltage reduction signal output from the power supply voltage monitoring unit, and which outputs a DC drive signal that is always at the high level during the power supply voltage reduction period and a given time period after the voltage reduction is returned, wherein
   the driving unit receives the DC drive signal output from the DC drive signal generating unit and the PWM signal output from the PWM signal generating unit.

3. The control apparatus for the electromagnetic inductive load according to claim 1, comprising:
   a logical sum unit which logically sums the clock signal and the PWM signal generated by the PWM signal generating unit, wherein
   the driving unit receives an output of the logical sum unit.

4. The control apparatus for the electromagnetic inductive load according to claim 1, wherein
the current sensing unit is disposed in a regenerative current flow path through which a regenerative current in the OFF time during the PWM driving operation of the switching element flows.

5. The control apparatus for the electromagnetic inductive load according to claim 4, wherein
the switching element is placed on a side of the DC power supply to be subjected to high-side driving,
the current sensing unit includes a sense resistor which is interposed in the regenerative current flow path, and
the current detecting unit includes an inversion circuit which inverts a terminal voltage of the sense resistor and a comparator which compares an output voltage of the inversion circuit with a set voltage.

6. The control apparatus for the electromagnetic inductive load according to claim 4, wherein
the switching element is placed on a side of the ground to be subjected to low-side driving,
the current sensing unit includes a sense resistor which is interposed in the regenerative current flow path, and
the current detecting unit includes a first voltage drop circuit which drops a terminal voltage of the sense resistor on a side of the DC-power supply, a second voltage drop circuit which drops a terminal voltage of the sense resistor on a side of the switching element, and a comparator which compares an output voltage of the first voltage drop circuit with an output voltage of the second voltage drop circuit.

7. The control apparatus for the electromagnetic inductive load according to claim 4, wherein
the switching element is placed on a side of the ground to be subjected to low-side driving,
the current sensing unit includes a sense resistor which is interposed in the regenerative current flow path, and
the current detecting unit includes a differential amplification circuit which obtains a deviation of a terminal voltage of the sense resistor on a side of the DC-power supply and a terminal voltage of the sense resistor on a side of the switching element, and a comparator which compares a differential output of the differential amplification circuit with a set voltage.

* * * * *